US011955632B2

(12) United States Patent
Kim et al.

(10) Patent No.: US 11,955,632 B2
(45) Date of Patent: Apr. 9, 2024

(54) POSITIVE ACTIVE MATERIAL PRECURSOR, POSITIVE ACTIVE MATERIAL, METHOD OF PREPARING THE SAME, POSITIVE ELECTRODE INCLUDING THE SAME AND RECHARGEABLE LITHIUM BATTERY INCLUDING THE SAME

(71) Applicant: SAMSUNG SDI CO., LTD., Yongin-si (KR)

(72) Inventors: Jinhwa Kim, Yongin-si (KR); Minhan Kim, Yongin-si (KR); Donggyu Chang, Yongin-si (KR); Jihyun Seog, Yongin-si (KR); Yuntaek Oh, Yongin-si (KR); Jungwoo Son, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 137 days.

(21) Appl. No.: 17/091,525

(22) Filed: Nov. 6, 2020

(65) Prior Publication Data
US 2021/0167379 A1 Jun. 3, 2021

(30) Foreign Application Priority Data

Nov. 29, 2019 (KR) .......................... 10-2019-0157302

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *H01M 10/0525* (2013.01);
(Continued)

(58) Field of Classification Search
CPC ............ H01M 4/525; H01M 10/0525; H01M 2004/021; H01M 2004/028;
(Continued)

(56) References Cited

U.S. PATENT DOCUMENTS

2008/0182170 A1 7/2008 Rong et al.
2009/0258296 A1* 10/2009 Kawasato ............. H01M 4/485
429/223

(Continued)

FOREIGN PATENT DOCUMENTS

JP 2019-043843 A 3/2019
KR 10-2008-0005995 A 1/2008

(Continued)

OTHER PUBLICATIONS

Examination report dated May 4, 2021 in corresponding Korean patent application No. 10-2019-0157302.

*Primary Examiner* — Daniel S Gatewood
(74) *Attorney, Agent, or Firm* — Knobbe, Martens, Olson & Bear LLP

(57) ABSTRACT

The application relates to a positive active material precursor including a transition metal composite oxide precursor. The transition metal composite oxide precursor exhibits a peak full width at half maximum of a (200) plane (2θ=about 42° to about 44°) in X-ray diffraction analysis in a range of about 0.3° to about 0.5°. The application also relates to a positive active material using the precursor, a method of preparing the same, and a positive electrode and a rechargeable lithium battery including the same.

20 Claims, 15 Drawing Sheets

(51) Int. Cl.
*H01M 4/02* (2006.01)
*H01M 10/0525* (2010.01)

(52) U.S. Cl.
CPC ...... *C01P 2002/72* (2013.01); *C01P 2002/78* (2013.01); *C01P 2002/85* (2013.01); *C01P 2004/03* (2013.01); *C01P 2004/50* (2013.01); *C01P 2006/12* (2013.01); *C01P 2006/40* (2013.01); *H01M 2004/021* (2013.01); *H01M 2004/028* (2013.01)

(58) Field of Classification Search
CPC .. H01M 4/0471; H01M 4/131; H01M 4/1391; H01M 4/485; H01M 4/505; H01M 10/052; C01G 53/42; C01G 53/00; C01G 53/006; C01P 2002/72; C01P 2002/78; C01P 2002/85; C01P 2004/03; C01P 2004/50; C01P 2006/12; C01P 2006/40; C01P 2002/54; C01P 2004/04; C01P 2004/10; C01P 2004/20; C01P 2004/45; C01P 2006/80; Y02E 60/10
See application file for complete search history.

(56) References Cited

U.S. PATENT DOCUMENTS

| | | | |
|---|---|---|---|
| 2011/0305955 A1* | 12/2011 | Song | ............... H01M 4/505 429/223 |
| 2015/0010819 A1 | 1/2015 | Lee | |
| 2016/0036041 A1 | 2/2016 | Uwai | |
| 2016/0181611 A1 | 6/2016 | Cho et al. | |
| 2018/0040896 A1 | 2/2018 | Choi et al. | |
| 2019/0379044 A1 | 12/2019 | Yun | |

FOREIGN PATENT DOCUMENTS

| | | | |
|---|---|---|---|
| KR | 10-2011-0136689 A | | 9/2013 |
| KR | 10-2015-0122172 A | | 6/2016 |
| KR | 10-2016-0074236 A | | 6/2016 |
| KR | 10-2015-0006283 A | | 10/2017 |
| KR | 10-2017-0119573 A | | 10/2017 |
| KR | 1020170119573 A | * | 10/2017 |
| KR | 10-2018-0015046 A | | 2/2018 |
| KR | 10-2017-0122000 A | | 3/2018 |
| KR | 10-2017-0076164 A | | 8/2018 |
| KR | 10-2018-0063857 A | | 10/2020 |

* cited by examiner

POSITIVE ACTIVE MATERIAL PRECURSOR, POSITIVE ACTIVE MATERIAL, METHOD OF PREPARING THE SAME, POSITIVE ELECTRODE INCLUDING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2019-0157302 filed in the Korean Intellectual Property Office on Nov. 29, 2019, the entire contents of which are incorporated herein by reference.

BACKGROUND

(a) Field

A positive active material precursor, a positive active material using the precursor, a method of preparing the same, and a positive electrode, and a rechargeable lithium battery including the same are disclosed.

(b) Description of the Related Technology

In recent years, according to the development of various electronic devices, high-capacity rechargeable batteries have been required, and particularly, rechargeable lithium batteries having higher energy density than nickel-cadmium batteries or nickel-hydrogen batteries have attracted attention.

The rechargeable lithium batteries mainly use lithium-containing cobalt oxide ($LiCoO_2$) as a positive active material, but in addition, the use of lithium-containing manganese oxide such as $LiMnO_2$ having a layered crystal structure, $LiMn_2O_4$ having a spinel crystal structure, and the like and lithium-containing nickel oxide such as $LiNiO_2$ are also being considered. Among the aforementioned positive active materials, $LiCoO_2$ has excellent cycle-life characteristics and charge and discharge efficiency and thus is the most used but has small capacity and is expensive due to the resource limitation of cobalt. Therefore, it has a limit in price competitiveness for mass use as a power source for mid- to large-large battery fields such as electric vehicles and the like.

SUMMARY

An embodiment provides a positive active material precursor for a rechargeable lithium battery having a needle-shaped or flake-shaped porous structure, an increased BET specific surface area, and improved reactivity with a lithium salt.

Another embodiment provides a positive active material having improved porosity and structural stability of particles by using the precursor. Another embodiment provides a method of preparing the positive active material that may reduce a preparation time and increase productivity.

Another embodiment provides a rechargeable lithium battery including the positive active material with improved charge/discharge efficiency and cycle-life characteristics.

An embodiment provides a positive active material precursor including a transition metal composite oxide precursor, wherein the transition metal composite oxide precursor exhibits a peak full width at half maximum (FWHM) of a (200) plane (2θ=about 42° to about 44°) in X-ray diffraction (XRD) analysis in a range of about 0.3° to about 0.5°.

The transition metal composite oxide precursor may be a compound represented by Chemical Formula 1.

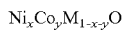  [Chemical Formula 1]

In Chemical Formula 1,
M is at least one selected from Mn, Ni, Co, Al, Fe, V, Ti, Mg, Zr, B, F and Cr, 0.3≤x≤1, 0≤y≤0.7, and 0.3≤x+y≤1.

The transition metal composite oxide precursor may include secondary particles in which a plurality of primary particles are aggregated, and the primary particles may have a flake or needle shape.

The transition metal composite oxide precursor may have a BET specific surface area of about 20 $m^2/g$ to about 60 $m^2/g$.

Another embodiment provides a positive active material for a rechargeable lithium battery prepared from the positive active material precursor and including a nickel-based lithium transition metal oxide represented by Chemical Formula 2 including secondary particles in which a plurality of primary particles are aggregated.

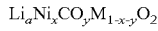  [Chemical Formula 2]

In Chemical Formula 2,
M is at least one selected from Mn, Ni, Co, Al, Fe, V, Ti, Mg, Zr, B, F, and Cr, 0.9≤a≤1.1, 0.3≤x≤1, 0≤y≤0.7, and 0.3≤x+y≤1.

The positive active material may further include a cobalt-based lithium transition metal oxide inside the secondary particle or between the plurality of primary particles.

An average interplanar spacing ($d_{(003)}$) of the (003) plane of the primary particles (surface grains) present in the surface portion of the secondary particles may be in the range of about 4.98 nm to about 5.00 nm and an average interplanar spacing ($d_{(003)}$) of the (003) plane of the primary particles (inside grains) present in the center portion of the secondary particles may be in the range of about 4.98 nm to about 5.00 nm.

A standard deviation of the interplanar spacings ($d_{(003)}$) of the primary particles present in the secondary particles may be in the range of about 0.005 to about 0.03.

The positive active material may further include a cobalt-based lithium transition metal oxide inside the secondary particle or between the plurality of primary particles.

The cobalt-based lithium transition metal oxide may be disposed in an area of less than or equal to about 30% with respect to the total radius of the secondary particles.

The cobalt-based lithium transition metal oxide may be included in an amount of about 1 wt % to about 5 wt % based on a total weight of the positive active material.

The positive active material may have a porosity of about 0.5% to about 2.5%.

The positive active material may have a BET specific surface area of about 0.4 $m^2/g$ to about 0.5 $m^2/g$.

The positive active material may have a pellet density of about 3.2 $g/cm^3$ to about 3.6 $g/cm^3$.

In another embodiment, a method of preparing a positive active material for a rechargeable lithium battery includes mixing a nickel compound and a cobalt compound and subjecting the mixture to a co-precipitation reaction, washing with water, filtering and drying the resulting product to prepare a transition metal hydroxide precursor represented by Chemical Formula 1A, subjecting the transition metal hydroxide precursor to primary heat treatment at about 400° C. to about 600° C. for about 0.5 hour to about 20 hours to prepare a transition metal composite oxide precursor, and mixing the transition metal composite oxide precursor and a dehydrated lithium salt and performing secondary heat treatment to prepare a nickel-based lithium transition metal oxide.

$$Ni_xCo_yM_{1-x-y}(OH)_2 \quad \text{[Chemical Formula 1A]}$$

In Chemical Formula 1A,

M is at least one selected from Mn, Ni, Co, Al, Fe, V, Ti, Mg, Zr, B, F, and Cr, $0.3 \le x \le 1$, $0 \le y \le 0.7$, and $0.3 \le x+y \le 1$.

The primary heat treatment may include a step firing process including a temperature increasing process; a maintaining process; a reaction process; and a temperature decreasing process, and the temperature increasing process may be performed by heating at a rate of about 1° C./min to about 5° C./min, the maintaining process may be performed at about 150° C. to about 250° C. for about 0.5 hours to about 10 hours, the reacting process may be performed at about 400° C. to about 600° C. for about 0.5 hours to about 10 hours, and the temperature decreasing process may be performed by decreasing a temperature at a rate of about 1° C./min to about 5° C./min.

The lithium salt may be a dehydrated lithium salt (e.g., dehydrated LiOH salt).

The secondary heat treatment may include a process of firing at a temperature of about 600° C. to about 800° C. for about 5 hours to about 25 hours.

The dehydrated lithium salt may be prepared by vacuum-drying the hydrated lithium salt at a temperature of about 50° C. to about 200° C. for about 0.5 hours to about 20 hours and then pulverizing the resulting product.

The method may further include washing the nickel-based lithium transition metal oxide and performing a third heat treatment after adding a cobalt raw material, sodium hydroxide, and optionally a metal raw material.

Another embodiment provides a rechargeable lithium battery including a positive electrode including the positive active material; a negative electrode; and an electrolyte.

By using a transition metal oxide having a high specific surface area and ionic conductivity properties in place of a conventional hydroxide precursor, the porosity, mixture density and structural stability of the positive active material particles may be improved and charge/discharge efficiency and cycle-life characteristics of the battery may be improved.

In addition, productivity may be improved and a process cost may be reduced when preparing a positive active material.

According to one or more alternative embodiments, a positive active material precursor for a rechargeable lithium battery is provided. The positive active material precursor comprises a transition metal composite oxide precursor configured to exhibits a peak full width at half maximum of a (200) plane (2θ=about 42° to about 44°) in an X-ray diffraction analysis in a range of about 0.3° to about 0.5°.

In some embodiments of the positive active material precursor, the transition metal composite oxide precursor comprises a compound represented by Chemical Formula 1:

$$Ni_xCo_yM_{1-x-y}O, \quad \text{[Chemical Formula 1]}$$

wherein M is at least one selected from Mn, Ni, Co, Al, Fe, V, Ti, Mg, Zr, B, F, and Cr, $0.3 \le x \le 1$, $0 \le y \le 0.7$, and $0.3 \le x+y \le 1$. The transition metal composite oxide precursor comprises a first set of secondary particles including a first plurality of primary particles aggregated to each other, and wherein each of the first primary particles has a flake or needle shape. The transition metal composite oxide precursor has a Brunauer-Emmett-Teller (BET) specific surface area of about 20 m2/g to about 60 m2/g.

According to one or more alternative embodiments, a positive active material for a rechargeable lithium battery prepared from the positive active material precursor according to one or more alternative embodiments herein is provided. The positive active material comprises a nickel-based lithium transition metal oxide represented by Chemical Formula 2 comprising a second set of secondary particles including a second plurality of primary particles aggregated to each other:

$$Li_aNi_xCo_yM_{1-x-y}O_2, \quad \text{[Chemical Formula 2]}$$

wherein M is at least one selected from Mn, Ni, Co, Al, Fe, V, Ti, Mg, Zr, B, F, and Cr, $0.9 \le a \le 1.1$, $0.3 \le x \le 1$, $0 \le y \le 0.7$, and $0.3 \le x+y \le 1$. The second primary particles have a (003) plane, wherein an average interplanar spacing (d(003)) of the (003) plane of the second primary particles (surface grains) present in a surface portion of the second set of secondary particles is in the range of about 4.98 nm to about 5.00 nm, and wherein an average interplanar spacing (d(003)) of the (003) plane of the second primary particles (inside grains) present in a center portion of the second set of secondary particles is in the range of about 4.98 nm to about 5.00 nm. A standard deviation of the interplanar spacings (d(003)) of the second primary particles present in the second set of secondary particles is in the range of about 0.005 to about 0.03.

According to one or more alternative embodiments, a positive active material further comprises a cobalt-based lithium transition metal oxide inside the second set of secondary particles or between the second plurality of primary particles. The cobalt-based lithium transition metal oxide is disposed in an area of less than or equal to about 30% of a total radius of the second set of secondary particles. The cobalt-based lithium transition metal oxide is included in an amount of about 1 wt % to about 5 wt % based on a total weight of the positive active material. The positive active material has a porosity of about 0.5% to about 2.5%. The positive active material has a Brunauer-Emmett-Teller (BET) specific surface area of about 0.4 $m^2$/g to about 0.5 $m^2$/g. The positive active material has a pellet density of about 3.2 $g/cm^3$ to about 3.6 $g/cm^3$. The first set of secondary particles are different from the second set of secondary particles, and wherein the first plurality of primary particles are the same as the second plurality of primary particles.

According to one or more alternative embodiments, a method of preparing a positive active material for a rechargeable lithium battery is provided. The method comprises mixing a nickel compound, a cobalt compound, and optionally a metal compound to obtain a first mixture, subjecting the first mixture to a co-precipitation reaction to obtain a first resulting product, washing with water, filtering and drying the first resulting product to prepare a transition metal hydroxide precursor represented by Chemical Formula 1A, $$Ni_xCo_yM_{1-x-y}(OH)_2, \quad \text{[Chemical Formula 1A]}$$

wherein M is at least one selected from Mn, Ni, Co, Al, Fe, V, Ti, Mg, Zr, B, F, and Cr, $0.3 \le x \le 1$, $0 \le y \le 0.7$, and $0.3 \le x+y \le 1$, subjecting the transition metal hydroxide precursor to a primary heat treatment at about 400° C. to about 600° C. for about 0.5 hour to about 20 hours to prepare a transition metal composite oxide precursor, mixing the transition metal composite oxide precursor and a lithium salt to obtain a second mixture and performing a secondary heat treatment on the second mixture to prepare a nickel-based lithium transition metal oxide.

According to one or more alternative embodiments of the a method of preparing a positive active material for a rechargeable lithium battery, the primary heat treatment comprises a step firing process comprising a temperature increase process, a maintenance process, a reaction process; and a temperature decrease process, the temperature increase process is performed by heating the transition metal hydroxide precursor at a rate of about 1° C./min to about 5° C./min, the maintenance process is performed at about 150° C. to about 250° C. for about 0.5 hours to about 10 hours, the reaction process is performed at about 400° C. to about 600° C. for about 0.5 hours to about 10 hours, and the temperature decrease process is performed by decreasing a temperature at a rate of about 1° C./min to about 5° C./min. The lithium salt comprises a dehydrated lithium salt including LiOH. The dehydrated lithium salt is prepared by vacuum-drying the hydrated lithium salt at a temperature of about 50° C. to about 200° C. for about 0.5 hours to about 20 hours and then pulverizing the resulting product. The secondary heat treatment comprises heating the second mixture at a temperature of about 600° C. to about 800° C. for about 5 hours to about 25 hours. The method further comprises washing the nickel-based lithium transition metal oxide and performing a third heat treatment after adding a cobalt raw material, sodium hydroxide, and optionally a metal raw material.

DETAILED DESCRIPTION

Figure 1:
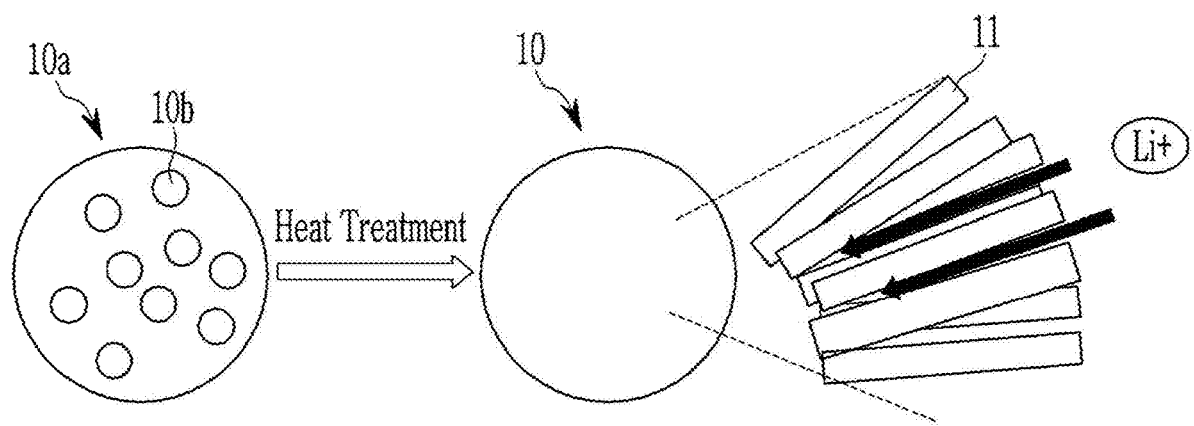
FIG. 1 is a schematic view showing secondary particles and primary particles of a transition metal composite oxide precursor included in a positive active material precursor according to an embodiment.

The lithium manganese oxides such as $LiMnO_2$, $LiMn_2O_4$, and the like have advantages of being inexpensive because of abundant manganese resources as raw materials, environmentally-friendly, and thermally safe but also, drawbacks of low capacity, insufficient high temperature characteristics and cycle characteristics, and the like. In order to compensate for these drawbacks, demand for a Ni rich system as the positive active material for the rechargeable batteries has begun to increase. This Ni rich system active material may realize high capacity but deteriorate battery performance according to a reaction with an electrolyte solution.

Hereinafter, embodiments of the described technology are described in detail. However, these embodiments are exemplary, the described technology is not limited thereto and the described technology is defined by the scope of claims.

As used herein, when specific definition is not otherwise provided, layer, when an element such as a layer, film, region, or substrate is referred to as being "on" another element, it may be directly on the other element or intervening elements may also be present.

An embodiment provides a positive active material precursor for a rechargeable lithium battery including a transition metal composite oxide precursor, wherein the transition metal composite oxide precursor exhibits a peak full width at half maximum of a (200) plane (2θ=about 42° to about 44°) in X-ray diffraction (XRD) analysis in a range of about 0.3° to about 0.5°. As used herein, (200) plane refers to a lattice plane corresponding to the Miller index (200).

The transition metal composite oxide precursor may be a compound represented by Chemical Formula 1.

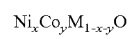 [Chemical Formula 1]

In Chemical Formula 1,

M is at least one selected from Mn, Ni, Co, Al, Fe, V, Ti, Mg, Zr, B, F, and Cr, 0.3≤x≤1, 0≤y≤0.7, and 0.3≤x+y≤1.

In the transition metal composite oxide precursor, an atomic concentration of Ni (nickel) excluding oxygen may be about 30 at % to about 100 at %, for example, about 20 at % to about 70 at %, or about 30 at % to about 70 at %. The above concentration ranges are merely examples, and other concentration ranges are also possible. When the nickel content of the transition metal composite oxide precursor is within the above range, capacity of the battery may be improved by increasing the Ni content involved in charging and discharging.

In the transition metal composite oxide precursor, an atomic concentration of Co (cobalt) excluding oxygen may be less than or equal to about 70 at %, for example, about 20 at % to about 60 at %, or about 30 at % to about 60 at %. The above concentration ranges are merely examples, and other concentration ranges are also possible. When the cobalt content of the transition metal composite oxide precursor is within the above range, efficiency of improving capacity versus cost may be maximized.

In the transition metal composite oxide precursor, M may be at least one metal element selected from Mn, Ni, Co, Al, Fe, V, Ti, Mg, Zr, B, F, and Cr, specifically selected from Mn, Ni, Co, or Al, and desirably Mn or Al. An atomic concentration of the metal element (M) excluding oxygen may be less than or equal to about 70 at %, such as about 10 at % to about 60 at % or about 10 at % to about 50 at %. Within the above range, stability of a battery may be more effectively improved. The above concentration ranges are merely examples, and other concentration ranges are also possible.

The positive active material precursor according to an embodiment exhibits a peak full width at half maximum of the (200) plane (2θ=about 42° to about 44°) in X-ray diffraction analysis in a range of about 0.3° to about 0.5°.

Specifically, the peak full width at half maximum may be desirably in the range of about 0.35° to about 0.45°. When the peak full width at half maximum is less than about 0.3°, the reactivity with the lithium salt decreases, and capacity characteristics of the active material may be deteriorated. In addition, when the peak full width at half maximum exceeds about 0.5°, gas may be generated inside the raw material (positive active material precursor) due to hydroxyl groups remaining during firing (or heating) of the raw material, thereby increasing a porosity of the active material, and a Li/Me weight ratio may be changed.

Meanwhile, the 2θ means a diffraction angle in X-ray diffraction analysis. It is known that a transition metal hydroxide precursor is present when peaks appear in the range of diffraction angles (2θ) of about 18° to about 20°, about 33° to about 35°, or about 38° to about 40°, whereas it is known that a transition metal oxide precursor is present when peaks appear about 36° to about 38°, about 42° to about 44°, at about 62° to about 64°, or about 75° to about 80°.

Hereinafter, a transition metal composite oxide precursor according to an embodiment is described with reference to FIG. 1.

FIG. 1 is a schematic view showing secondary particles and primary particles of a transition metal composite oxide precursor included in a positive active material precursor according to an embodiment.

Referring to FIG. 1, the transition metal composite oxide precursor may include secondary particles 10 in which a plurality of primary particles 11 are aggregated.

The secondary particles 10 may include the primary particles that are radially aggregated in a single center or multiple centers.
The secondary particles 10 may include one or more ion channels.

The primary particles 11 may have a flake or needle shape.

The secondary particles 10 of the transition metal composite oxide precursor of the present disclosure have a modified morphology by removing moisture 10b by heat treatment of the secondary particles 10a (or pre-heat treated secondary particles 10a) of the transition metal composite hydroxide precursor under specific conditions. As a result, the secondary particles 10 (or a first set of secondary particles 10) of the transition metal composite oxide precursor include flake-shaped or needle-shaped primary particles 11, and may have a porous structure in which the plurality of primary particles 11 (or a first plurality of primary particles 11) may be radially aggregated in a single center or multiple centers. In addition, the secondary particles 10 (or a second set of secondary particles 10) may include one or more ion channels. The second set of secondary particles 10 may include a second plurality of primary particles 11. The second plurality of primary particles 11 may be the same as or different from the first plurality of primary particles 11. Accordingly, when preparing a positive active material, lithium ions (Li+) penetrate into the secondary particles 10 of the transition metal composite oxide precursor and are easily diffused, and a high-quality positive active material may be prepared with a high yield.

The transition metal composite oxide precursor may have a Brunauer-Emmett-Teller (BET) specific surface area of about 10 m²/g to about 70 m²/g, for example about 20 m²/g to about 60 m²/g. Brunauer-Emmett-Teller theory can be used to measure the specific surface area of materials. The above surface area ranges are merely examples, and other surface area ranges are also possible. As described above, since the transition metal composite oxide precursor has a porous structure, it may have a relatively high BET specific surface area, and thus lithium ions penetrate and are diffused into the precursor during production of an active material.

Another embodiment provides a positive active material produced from the positive active material precursor and including a nickel-based lithium transition metal oxide represented by Chemical Formula 2 including secondary particles in which a plurality of primary particles are aggregated:

  [Chemical Formula 2]

Li$_a$Ni$_x$Co$_y$M$_{1-x-y}$O$_2$

In Chemical Formula 2,

M is at least one selected from Mn, Ni, Co, Al, Fe, V, Ti, Mg, Zr, B, F, and Cr, 0.3≤x≤1, 0≤y≤0.7, and 0.3≤x+y≤1.

In the nickel-based lithium transition metal oxide, the composition and content of Ni, Co, and M of Chemical Formula 2 may be the same as the composition and content of Ni, Co, and M of Chemical Formula 1 in the transition metal composite oxide precursor.

In the nickel-based lithium transition metal oxide, the atomic concentration of Li of Chemical Formula 2 may be about 90 at % to about 120 at %, or about 95 at % to about 110 at %. The above concentration ranges are merely examples, and other concentration ranges are also possible. Within the above range, the content ratio of lithium/transition metal essential for battery operation is appropriate, and thus charging/discharging efficiency and capacity of a battery may be improved.

The positive active material may further include a cobalt-based lithium transition metal oxide inside the secondary particle or between the plurality of primary particles. When the cobalt-based lithium transition metal oxide is included inside the secondary particles or between the plurality of primary particles (between primary particles, that is grain boundaries), a LCO (LiCoO$_2$)-like phase is formed to increase high rate charge/discharge efficiency and to reduce material resistance, and thus to secure a wide cell design margin. Therefore, high-temperature cycle-life characteristics may be improved with the design margin secured in a high-temperature region where the N/P margin becomes small.

The cobalt-based lithium transition metal oxide may be a compound represented by Chemical Formula 3.

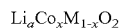  [Chemical Formula 3]

Li$_a$Co$_x$M$_{1-x}$O$_2$

In Chemical Formula 3,

M is at least one selected from Mn, Ni, Co, Al, Fe, V, Ti, Mg, Zr, B, F, and Cr, 0.9≤a≤1.1, and 0.7≤x≤1.

In the cobalt-based lithium transition metal oxide, the content of Co (cobalt) may be about 70 at % to about 100 at %, for example about 80 at % to about 100 at %, of elements excluding lithium and oxygen. The above ranges for content of Co are merely examples, and other ranges are also possible. Within the above range, cell characteristics may be effectively improved. The cobalt-based lithium transition metal oxide may be present in a thickness region of about 30% or less from the surface of the secondary particle and specifically, in the thickness region of about 25% or less from the surface thereof, or about 20% or less from the surface thereof with respect to the total radius of the secondary particle. The above thicknesses are merely examples, and other thicknesses are also possible. In addition, the cobalt-based lithium transition metal oxide may be formed by adding a portion of a lithium-based flux material including lithium hydroxide (LiOH) or a boron-based flux material lithium tetraborate ($Li_2B_4O_7$), boron oxide ($B_2O_3$) to the cobalt raw material to penetrate into the secondary particles along the grain surface of the primary particles, unlike a general coating layer present only on the surface of the secondary particles. These may be because the transition metal composite oxide precursor according to the embodiment has a larger BET specific surface area than the conventional one, an ion channel (tunnel) that facilitates intercalation/deintercalation and diffusion of lithium ions is formed inside the particle, and the full width at half maximum of a (200) plane satisfies the above desirable range. On the other hand, when a region including the cobalt-based lithium transition metal oxide is too thick, capacity of the battery may be reduced, and charging and discharging characteristics of the battery as the surface of the secondary particle changes to a rock-salt structure and thus cycle-life characteristics may be rapidly deteriorated.

An average interplanar spacing ($d_{(003)}$) of the (003) plane of the primary particles (surface grains) present in the surface portion of the secondary particles and an average interplanar spacing ($d_{(003)}$) of the (003) plane of the primary particles (inside grains) present in the center portion of the secondary particles may be in the range of about 4.98 nm to about 5.00 nm, respectively. The (003) plane refers to a lattice plane corresponding to the Miller index (003).

The average interplanar spacing of the (003) plane of the primary particle present in the surface portion of the secondary particle and the average interplanar spacing of the (003) plane of the primary particle present in the center portion of the secondary particle may fall within the substantially same numerical range. Herein, being in substantially the same numerical range means that a difference between the average interplanar spacing between the surface portion of the secondary particle and the primary particle in the center portion is less than or equal to about 5 nm, for example, less than or equal to about 3 nm, or less than or equal to about 1 nm. The above spacing values are merely examples, and other spacing values are also possible. Accordingly, structural stability of the positive active material may be improved, and charge/discharge efficiency and cycle-life characteristics of a battery may be improved.

In general, when synthesizing a positive active material, a concentration of Li varies depending on the position of the transition metal oxide. That is, since Li sequentially flows from the surface to the inside of the positive active material precursor, the interplanar spacing (lattice) of the (003) plane varies according to the positions of the surface and internal portions of the transition metal oxide particles. Due to this, capacity, rate characteristics, and cycle-life characteristics of the battery may be deteriorated. Accordingly, when the transition metal composite oxide precursor according to an embodiment is used to synthesize the positive active material, Li mat be relatively uniformly introduced into the precursor particles as well as the surfaces thereof. Accordingly, since the average interplanar spacings (lattice) of the (003) planes of primary particles of the surface and internal portions of the positive active material secondary particles are uniform, the positive active material particles may be prevented from structural distortion according to the Li intercalation/deintercalation during the charge and discharge. In other words, when the same lattice changes occurs in the surface and internal portions of the positive active material particles during the battery charge and discharge, cycle-life characteristics may be improved, but when lattices of the surface and internal portions exist in different states in positive active material particles prepared by the conventional art, the structural distortion may be amplified as much as the lattice difference and accelerate deterioration of a battery cycle-life.

On the other hand, the average interplanar spacing of the (003) planes of the primary particles is obtained by averaging interplanar spacings of the (003) planes of randomly selected ten primary particles, which may be measured with HR-TEM.

On the other hand, primary particles in the surface portion of the secondary particle are particles located about 100 nm to about 600 nm deep from the outermost surface of the secondary particles, but primary particles in the center portion of the secondary particle are particles located in the regions excluding the surface portion.

The interplanar spacings ($d_{(003)}$) of the primary particles in the surface portion of the secondary particle and the primary particles in the center portion of the secondary particle may have each standard deviation of about 0.005 to about 0.03. Within the range, structural stability of the positive active material may be improved, and charge and discharge efficiency and cycle-life characteristics of the battery may be improved.

The cobalt-based lithium transition metal oxide may be included in an amount of about 1 to about 5 wt %, for example, greater than or equal to about 1 wt %, greater than or equal to about 1.5 wt %, or greater than or equal to about 2.0 wt % and less than or equal to about 5 wt %, less than or equal to about 4.5 wt %, less than or equal to about 4.0 wt %, or less than or equal to about 3.5 wt % based on a total weight of the positive active material. The above amounts are merely examples, and other amounts ranges are also possible. Within the ranges, film resistance may be reduced to improve ion conductivity, and the charge and discharge efficiency and the cycle-life characteristics of the battery may be improved.

The positive active material may have porosity of about 0.5% to about 2.5%, for example, greater than or equal to about 0.5%, greater than or equal to about 0.7%, or greater than or equal to about 1.0% and less than or equal to about 2.5%, less than or equal to about 2.0%, or less than or equal to about 1.5%. The above porosity values are merely examples, and other porosity values are also possible. When the positive active material has porosity within the ranges, the BET specific surface area of the positive active material may be decreased. When the porosity is greater than or equal to about 0.5%, lithium ions may be easily intercalated and deintercalated, and thus rate capability and charge and discharge efficiency characteristics of the battery may be improved, but when the porosity is less than or equal to about 2.5%, electrode density is increased to improve battery capacity, and the positive active material is suppressed from a side reaction on the surface during the battery operation and thus prevented from particle cracks.

On the other hand, the porosity of the positive active material may be area % of pores on the largest cross-section of the positive active material secondary particle.

The positive active material may have pellet density of about 3.1 g/cm$^3$ to about 3.7 g/cm$^3$, for example, about 3.2 g/cm$^3$ to about 3.6 g/cm$^3$, and desirably, about 3.5 g/cm$^3$ to about 3.7 g/cm$^3$. The above densities are merely examples, and other densities are also possible. When the pellet density of the positive active material is less than the ranges, a positive electrode may be manufactured through excessive pressing to increase density of the positive electrode, but there may be problems of destroying a positive electrode plate, having disadvantageous influences on impregnation of the electrolyte solution, and the like and thus deteriorating cycle-life and electrochemical characteristics of the rechargeable lithium battery.

Hereinafter, a method of preparing a positive active material according to an embodiment is provided.

A method of preparing the positive active material comprises mixing a nickel compound, a cobalt compound, and optionally a metal compound to obtain a first mixture, subjecting the first mixture to a co-precipitation reaction to obtain a first resulting product, washing with water, filtering and drying the first resulting product to prepare a transition metal hydroxide precursor represented by Chemical Formula 1A, $$Ni_xCo_yM_{1-x-y}(OH)_2 \quad \text{[Chemical Formula 1A]}$$

In Chemical Formula 1A, M is at least one selected from Mn, Ni, Co, Al, Fe, V, Ti, Mg, Zr, B, F, and Cr, $0.3 \le x \le 1$, $0 \le y \le 0.7$, and $0.3 \le x+y \le 1$.

subjecting the transition metal hydroxide precursor to a primary heat treatment at about 400° C. to 600° C. for about 0.5 hour to about 20 hours to prepare a transition metal composite oxide precursor, and mixing the transition metal composite oxide precursor and a lithium salt to obtain a second mixture and performing a secondary heat treatment on the second mixture to prepare a nickel-based lithium transition metal oxide. In some embodiments, the lithium salt is a dehydrated lithium salt. In some embodiments, the dehydrated lithium salt may include LiOH.

The composition and content of the Ni, Co, and M metal elements of Chemical Formula 1A may be the same as the composition and content of the transition metal composite oxide precursor represented by Chemical Formula 1.

Examples of the nickel compound may include $Ni(OH)_2$, NiO, NiOOH, $NiCO_3 \cdot 2Ni(OH)_2 \cdot 4H_2O$, $NiC_2O_4 \cdot 2H_2O$, $Ni(NO_3)_2 \cdot 6H_2O$, $NiSO_4$, $NiSO_4 \cdot 6H_2O$, fatty acid nickel salts, or nickel halides. Among these, from the viewpoint of not generating harmful substances such as NOx and SOx during the firing of the precursor, it is desirable not to contain nitrogen or sulfur atoms such as $Ni(OH)_2$, NiO, NiOOH, $NiCO_3 \cdot 2Ni(OH)_2 \cdot 4H_2O$, and $NiC_2O_4 \cdot 2H_2O$ during firing treatment. These nickel compounds may be used alone or in combination of two or more. The above nickel compounds are merely examples, and other nickel compounds are also possible.

Examples of the cobalt compound may include $Co(OH)_2$, CoOOH, CoO, $Co_2O_3$, $Co_3O_4$, $Co(OCOCH_3)_2 \cdot 4H_2O$, $CoCl_2$, $Co(NO_3)_2 \cdot 6H_2O$, and $Co(SO_4)_2 \cdot 7H_2O$. Among these, from the viewpoint of not generating harmful substances such as NOx and SOx during the firing of the precursor, $Co(OH)_2$, CoOOH, CoO, $Co_2O_3$, and $Co_3O_4$ may be desirable. $Co(OH)_2$ and CoOOH are more desirable from the viewpoint of industrially inexpensive and high reactivity. These cobalt compounds may be used alone or in combination of two or more. The above cobalt compounds are merely examples, and other cobalt compounds are also possible.

The metal compound may be a compound containing Mn, Ni, Co, Al, Fe, V, Ti, Mg, Zr, B, F, Cr, or a combination thereof, specifically a compound containing Mn, Ni, Co, Al, or a combination thereof may be used.

The co-precipitation reaction process may include adding an alkali solution to a mixture of the nickel compound, the cobalt compound, and optionally the metal compound, and performing neutralization and precipitation reactions to prepare a transition metal hydroxide or a metal composite carbonate.

The alkali solution is used to adjust a reaction pH, and may be used in an appropriate amount to achieve a desired pH. As the alkaline solution, an aqueous solution such as sodium hydroxide, potassium hydroxide, sodium carbonate, and ammonia may be used.

The co-precipitation reaction temperature may be desirably greater than or equal to about 30° C., for example, about 30° C. to about 60° C.

The washing, filtering, and drying process may include suction-filtering, washing, and drying the transition metal hydroxide precursor obtained through the co-precipitation reaction and may include any process in general adopted to manufacture an active material precursor without a particular limit.

The first heat treatment may be to heat-treat the transition metal hydroxide precursor at about 400° C. to about 600° C., for example, about 450° C. to about 550° C., or about 480° C. to about 520° C. for about 0.5 hours to about 20 hours, for example, about 0.5 hours to about 15 hours, or about 5 hours to about 15 hours. The above temperature and time ranges are merely examples, and other temperature and time ranges are also possible.

The primary heat treatment may include step firing processes. These step firing processes may include a temperature increasing process, a holding process, a reaction process, and a temperature decreasing process. Specifically, the step firing processes may be to increase a temperature from room temperature up to about 150° C. to about 250° C. at about 1° C./min to about 5° C./min, maintained for about 0.5 hours to about 10 hours, increase the temperature again at rate of about 1° C./min to about 5° C./min up to about 400° C. to about 600° C., for example, reacting at about 450° C. to about 550° C. or about 480° C. to about 520° C. for about 0.5 hours to about 10 hours, and decreasing the temperature down to room temperature at a rate of about 1° C./min to about 5° C./min. The step firing processes may advantageously provide a transition metal composite oxide precursor having a peak full width at half maximum within the range of about 0.3° to about 0.5° according to an embodiment. The above temperature and time ranges are merely examples, and other temperature and time ranges are also possible.

The dehydrated lithium salt and the transition metal composite oxide precursor are mixed in a Li/(Ni+Co+M) mole ratio of about 0.9 to about 1.1 and specifically, about 0.95 to about 1.1. The above mole ratios are merely examples, and other mole ratios are also possible.

The dehydrated lithium salt may be prepared by vacuum-drying commercially-available hydroxide lithium salt ($LiOH \cdot H_2O$, beads type) at about 50° C. to about 200° C. for about 0.5 hours to about 20 hours and pulverizing it to have a particle diameter (D50) of about 5 μm to about 20 μm. Herein, the dehydrated lithium salt may be prepared by using $LiOH \cdot H_2O$ as a raw material. The above temperature, time, and diameter ranges are merely examples, and other temperature, time, and diameter ranges are also possible.

When the transition metal composite oxide precursor and the dehydrated lithium salt are used, a moisture generation amount is greatly reduced during the preparation of the active material, which may shorten the firing time (e.g., temperature-increasing time during the secondary heat treatment) and widen the use range of the atmosphere gas during the firing. In other words, a high nickel based positive active material is in general prepared through firing under an oxygen atmosphere with high purity, but the described technology may adopt firing under a decarbonized air atmosphere. As a result, there are advantages in the process such as lowering the active material manufacturing cost, improving the active material production yield, and the like. On the contrary, when the transition metal hydroxide precursor is mixed and heat-treated with the dehydrated lithium salt or the hydrated lithium salt, moisture inside the hydroxide precursor or in the hydrated lithium salt may increase inner pores of the positive active material and deteriorate reactivity of the active material with lithium ions.

The secondary heat treatment is to fire (or heat) at about 600° C. to about 800° C. or about 650° C. to about 800° C. for about 0.5 hours to about 25 hours, about 1 hour to about 20 hours, or about 5 hours to about 15 hours after mixing the transition metal composite oxide precursor and the dehydrated lithium salt to manufacture nickel-based lithium transition metal oxide. The above temperature and time ranges are merely examples, and other temperature and time ranges are also possible.

On the other hand, the secondary heat treatment may be performed under an oxidizing gas atmosphere, an oxygen atmosphere, a decarbonized air atmosphere, or the like.

Subsequently, the obtained nickel-based lithium transition metal oxide is washed, and simultaneously, a cobalt raw material, sodium hydroxide, and optionally, a metal raw material are added thereto, and then, a third heat treatment may be further performed.

The third heat treatment after mixing the nickel-based lithium transition metal oxide and water in a weight ratio of about 1:about 0.5 to about 1:about 1.5 and then, adding the cobalt raw material, sodium hydroxide (NaOH), and optionally, the metal raw material may provide a positive active material further including cobalt-based lithium transition metal oxide. The above weight ratios are merely examples, and other weight ratios are also possible.

The cobalt raw material may include at least one selected from $Co(OH)_2$, $CoSO_4$, $Co(CH_3COO)_2$, $Co(NO_3)_2$, $CoCl_2$, and $Co_3(PO_4)_2$. The above Co raw materials are merely examples, and other Co raw materials are also possible.

The metal raw material may be a metal raw material including at least one selected from Mn, Ni, Co, Al, Fe, V, Ti, Mg, Zr, B, F, and Cr, specifically an oxynitride, chloride, sulfur oxide, or hydroxide including Al, Ti, Mg, Zr, or a combination.

The third heat treatment may be performed at about 600° C. to about 800° C. for about 0.5 hours to about 20 hours under an oxygen atmosphere. The above temperature and time ranges are merely examples, and other temperature and time ranges are also possible.

Another embodiment provides a rechargeable lithium battery including a positive electrode including the positive active material; a negative electrode; and an electrolyte.

The positive electrode includes a current collector and a positive active material layer on the current collector and including a positive active material.

The positive active material is as described above, and may be included in an amount of about 90 wt % to about 98 wt % based on a total weight of the positive active material layer. The above amount range is merely an example, and other amount ranges are also possible.

In addition, the positive active material layer may further include a binder and a conductive material.

The binder may include polyvinyl alcohol, carboxymethyl cellulose, hydroxypropyl cellulose, diacetyl cellulose, polyvinyl chloride, polyvinyl fluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and the like, but is not limited thereto. The above binders are merely examples, and other binders are also possible.

Examples of the conductive material include carbon materials such as natural graphite, artificial graphite, carbon black, acetylene black, ketjen black, and a carbon fiber; a metal powder such as copper, nickel, aluminum, silver, or a metal fiber; a conductive polymer such as a polyphenylene derivative; or a mixture thereof. The above conductive materials are merely examples, and other conductive materials are also possible.

Each amount of the binder and the conductive material may independently be about 1 wt % to about 5 wt % based on a total weight of the positive active material layer. The above range is merely an example, and other ranges are also possible.

A mixture density of the positive electrode may be about 3.5 $g/cm^3$ to about 3.9 $g/cm^3$, for example about 3.5 $g/cm^3$ to about 3.8 $g/cm^3$. The above range is merely an example, and other ranges are also possible.

The current collector may be an aluminum foil, a nickel foil, or a combination thereof, but is not limited thereto.

The negative electrode includes a current collector and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide. The above negative active materials are merely examples, and other negative active materials are also possible.

The material that reversibly intercalates/deintercalates lithium ions may include a carbonaceous material. The carbonaceous material may be any generally-used carbon-based negative active material in a rechargeable lithium ion battery. Examples thereof may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but is not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but is not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of about 95 wt % to about 99 wt % based on a total weight of the negative active material layer. The above amount range is merely an example, and other amount ranges are also possible.

In an embodiment, the negative active material layer includes a binder, and may optionally further include a conductive material. A content of the binder in the negative active material layer may be about 1 wt % to about 5 wt % based on a total weight of the negative active material layer. When the negative active material layer further includes a conductive material, the negative active material layer includes about 90 wt % to about 98 wt % of the negative active material, about 1 wt % to about 5 wt % of the binder, and about 1 wt % to about 5 wt % of the conductive material. The above binder content ranges are merely examples, and other binder content ranges are also possible.

The binder improves binding properties of negative active material particles with one another and with a current collector. The binder includes a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The above non-water-soluble binders are merely examples, and other non-water-soluble binders are also possible.

The water-soluble binder may include a styrene-butadiene rubber, an acrylated styrene-butadiene rubber (SBR), an acrylonitrile-butadiene rubber, an acrylic rubber, a butyl rubber, a fluorine rubber, an ethylenepropylene copolymer, polyepichlorohydrine, polyphosphazene, polyacrylonitrile, polystyrene, an ethylenepropylene diene copolymer, polyvinylpyridine, chlorosulfonated polyethylene, latex, a polyester resin, an acrylic resin, a phenolic resin, an epoxy resin, polyvinyl alcohol, or a combination thereof. The above water-soluble binders are merely examples, and other non-water-soluble binders are also possible.

When the water-soluble binder is used as a negative electrode binder, a cellulose-based compound may be further used as a thickener to provide viscosity. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of about 0.1 to about 3 parts by weight based on 100 parts by weight of the negative active material.

The conductive material may include: a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include at least one selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, t-butylacetate, methyl propionate, ethyl propionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (wherein R may be a C2 to C20 linear, branched, or cyclic hydrocarbon group and R may include a double bond, an aromatic ring, or an ether bond), and the like, amides such as dimethyl formamide and the like, dioxolanes such as 1,3-dioxolane and the like, sulfolanes, and the like.

The organic solvent may be used alone or in a mixture of two or more, and a mixing ratio when used in a mixture of two or more may be appropriately adjusted according to the desired battery performance, which may be widely understood by those engaged in the field.

In addition, the organic solvent may further include an aromatic hydrocarbon-based organic solvent. Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4 trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound as a cycle-life improvement additive.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the cycle-life improvement additive may be within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_5)_2$, $LiC_4F_9SO_3$, $LiClO_4$, $LiAlO_2$, $LiAlO_4$, $LiN(C_xF_{2x+1}SO_2)(C_yF_{2y+1}SO_2)$, (wherein x and y are natural numbers, for example an integer of 1 to 20), LiCl, LiI, and $LiB(C_2O_4)_2$ (lithium bis(oxalato) borate, LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, a cylindrical rechargeable lithium battery is exemplarily described as an example of a rechargeable lithium battery.

Figure 2:
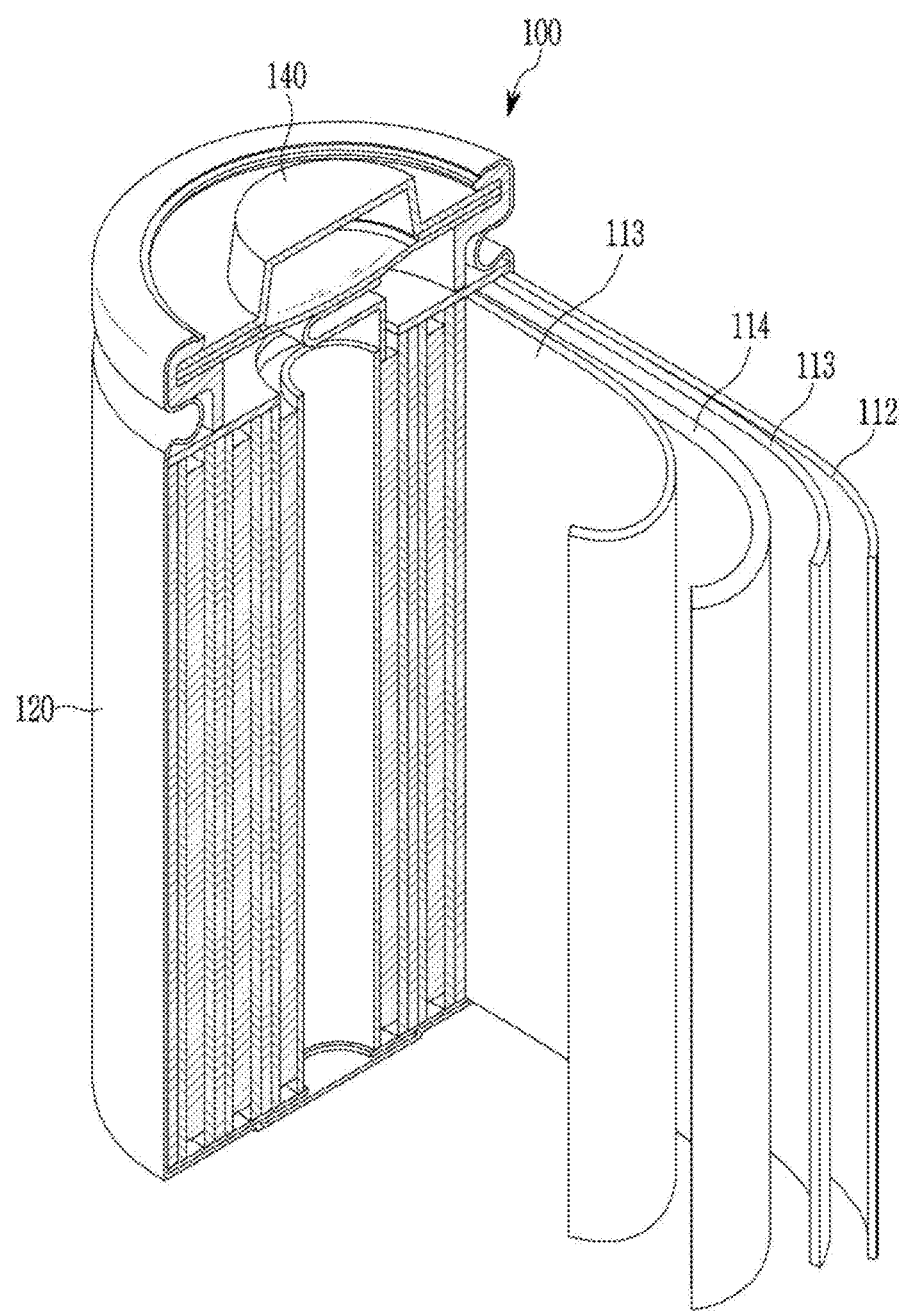
FIG. 2 is a schematic view showing a structure of a rechargeable lithium battery according to an embodiment.

FIG. 2 is an exploded perspective view of a rechargeable lithium battery according to an embodiment.

Referring to FIG. 2, a rechargeable lithium battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114, and the separator 113, a battery case 120 housing the battery cell, and a sealing member 140 sealing the battery case 120.

Hereinafter, embodiments of the described technology are described in detail so that those skilled in the art to which the described technology pertains may easily practice. As those skilled in the art would realize, the described embodiments may be modified in various different ways, all without departing from the spirit or scope of the described technology.

EXAMPLE 1

Example 1-1

80 L of distilled water was put in a 100 L reactor equipped with an agitator and an overflow pipe and then, stirred, while the reactor was maintained at 45° C. A nickel and cobalt aqueous solution (in a mole ratio of Ni:Co=92:8) at a concentration of 2.3 M and a chelating agent ($NH_4OH$) solution were simultaneously added thereto, and a NaOH solution at a concentration of 4.80 M was put in the reactor to adjust pH. pH of the reaction solution was maintained at 10 to 13. The reactor was supplied with nitrogen ($N_2$) to create an inactive atmosphere. The reaction solution was made to stay in the reactor for 14 hours to 18 hours on average by controlling a flow rate of the reaction solution, and when the reaction reached a steady state, a solution including nickel cobalt hydroxide was continuously obtained through the pipe.

From the prepared solution, nickel cobalt hydroxide was collected, washed, filtered, and dried in an 100° C. to 120° C. warm air drier for 0.5 hours to 20 hours to obtain a nickel cobalt hydroxide precursor ($NiCo(OH)_2$).

$NiCo(OH)_2$ was heat-treated through step firing process of increasing the temperature from room temperature up to 150° C. to 250° C. under an air atmosphere, maintaining it for 5 hours, increasing the temperature again at 1° C. to 5° C./min, reacted at 500° C. for 15 hours, and then, cooling down to room temperature at 1 to 5° C./min (heating time: 5 hr/holding time: 5 hr/reaction time: 15 hr/cooling time: 5 hr) to obtain a positive active material precursor including a nickel cobalt oxide precursor ($Ni_{0.93}Co_{0.07}O$).

Example 1-2

A beads-type lithium hydroxide salt ($LiOH \cdot H_2O$) was vacuum-dried at 50° C. to 200° C. for 0.5 hours to 20 hours and pulverized to prepare anhydrous lithium hydroxide (LiOH) having a center particle diameter (D50) of 5 μm to 20 μm.

The nickel cobalt oxide precursor and the anhydrous lithium hydroxide were mixed in a Li/Metal mole ratio of 0.95 to 1.1 and heat-treated at 650° C. to 800° C. under an oxygen atmosphere for 5 hours to 25 hours.

The heat-treated product was roll-milled and jet-milled, filtered, and mixed with water in a ratio between lithium nickel cobalt oxide and water of 1:0.5 to 3, and then, the resulting product was stirred and washed. Herein, 1 mol % to 5 mol % of $Co(SO_4)_2 \cdot 7H_2O$ based on 100 mol % of an active material and NaOH relative to Co in an equivalent ratio of 1:1.5 to 1:3 were additionally added thereto for washing and simultaneously, surface coating.

The prepared solution was treated with a filter press (set at a moisture content of 4% to 10%) to remove moisture, dried in a 100° C. to 250° C. vacuum-drier, and heat-treated at 650° C. to 730° C. for 0.5 hours to 20 hours under an oxygen atmosphere. Then, the product was crushed (with a colloidal mill), iron was removed therefrom, and the resulting product was filtered to obtain a final positive active material.

Example 1-3

94 wt % of the prepared positive active material, 3 wt % of ketjen black, and 3 wt % of polyvinylidene fluoride were mixed in an N-methyl pyrrolidone solvent to prepare positive active material slurry, and this positive active material slurry was coated on one surface of an Al foil current collector, dried, and compressed to manufacture a positive electrode.

In addition, 85 wt % of a natural graphite negative active material, 10 wt % of ketjen black, and 5 wt % of polyvinylidene fluoride were mixed in an N-methyl pyrrolidone solvent to prepare negative active material slurry, and the negative active material slurry was coated on one surface of a copper current collector to manufacture a negative electrode.

Subsequently, a porous polyethylene separator was disposed between the positive electrode and the negative electrode to obtain an electrode assembly, and then, the electrode assembly was housed inside a battery case, and an electrolyte solution was injected thereinto to manufacture a rechargeable lithium battery cell. Herein, the electrolyte solution was prepared by dissolving $LiPF_6$ at a concentration of 1.15 M in a mixed solvent of ethylene carbonate, dimethyl carbonate, and ethylmethyl carbonate (in a volume ratio of EC:DMC:EMC=30:40:30).

Example 2

A positive active material precursor, a positive active material, a positive electrode, and a rechargeable lithium battery cell were manufactured according to the same method as Example 1 except that the step firing (heating time: 5 hr/holding time: 5 hr/reaction time: 15 hr/cooling time: 5 hr) was performed at 550° C.

Example 3

A positive active material precursor, a positive active material, a positive electrode, and a rechargeable lithium battery cell were manufactured according to the same method as Example 1 except that the step firing (heating time: 5 hr/holding time: 5 hr/reaction time: 15 hr/cooling time: 5 hr) was performed at 450° C.

Comparative Example 1

A positive active material, a positive electrode, and a rechargeable lithium battery cell were manufactured according to the same method as Example 1 except that the nickel cobalt hydroxide precursor (NiCo(OH)$_2$) of Example 1-1 was used as a positive active material precursor.

Comparative Example 2

A positive active material precursor, a positive active material, a positive electrode, and a rechargeable lithium battery cell were manufactured according to the same method as Example 1 except that the step firing (heating time: 5 hr/holding time: 5 hr/reaction time: 15 hr/cooling time: 5 hr) was performed at 600° C.

Comparative Example 3

A positive active material precursor, a positive active material, a positive electrode, and a rechargeable lithium battery cell were manufactured according to the same method as Example 1 except that the step firing (heating time: 5 hr/holding time: 5 hr/reaction time: 15 hr/cooling time: 5 hr) was performed at 400° C.

Comparative Example 4

A positive active material precursor, a positive active material, a positive electrode, and a rechargeable lithium battery cell were manufactured according to the same method as Example 1 except that the nickel cobalt hydroxide precursor (NiCo(OH)$_2$) of Example 1-1 was used as a positive active material precursor, and LiOH—H$_2$O was used instead of the dehydrated lithium salt.

Evaluation Example

Figure 3:
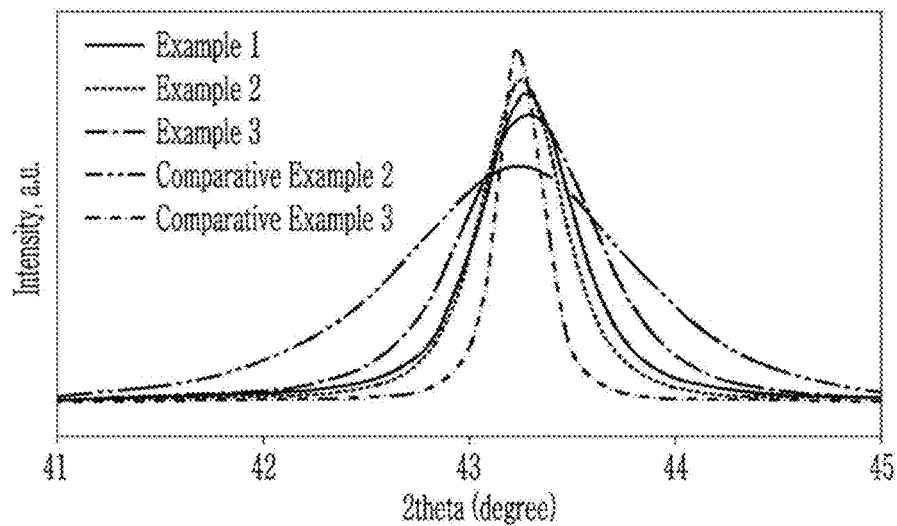
FIG. 3 is a graph showing an X-ray diffraction analysis peak of a transition metal oxide or hydroxide precursor.

Evaluation Example 1: X-Ray Diffraction (XRD) Analysis of Positive Active Material Precursor XRD analyses of the positive active material precursors of Examples 1 to 3 and Comparative Examples 1 to 4 were performed. FIG. 3 shows peaks within the diffraction angle (2θ) range of 42° to 44°, and peak full widths at half maximum were measured and then, shown in Table 1.

An XRD analyzer (Xpert PRO, Philips/Power 3 kW) was used, and as an X-ray source, a CuK-alpha characteristic X-ray wavelength of 1.541 Å was used. Herein, the diffraction angle (2θ) was measured within the range of 10° to 90°, and a scan rate was 0.013 sec/step.

TABLE 1

|  | Peak full width at half maximum (2θ = 42° to 44°) (°) |
| --- | --- |
| Example 1 | 0.42 |
| Example 2 | 0.31 |
| Example 3 | 0.52 |
| Comparative Example 1 | — |
| Comparative Example 2 | 0.19 |
| Comparative Example 3 | 0.61 |
| Comparative Example 4 | — |

Referring to FIG. 3 and Table 1, the positive active material precursors according to Examples 1 to 3 exhibited a peak having a full width at half maximum of 0.3 to 0.5 within the range of 2θ=42° to 44°. On the other hand, Comparative Examples 1 and 4 used a transition metal hydroxide precursor and thus exhibited no peak within the diffraction angle range, and the full widths at half maximum of the peaks of Comparative Examples 2 and 3 were out of the range of the described technology.

Figure 4A:
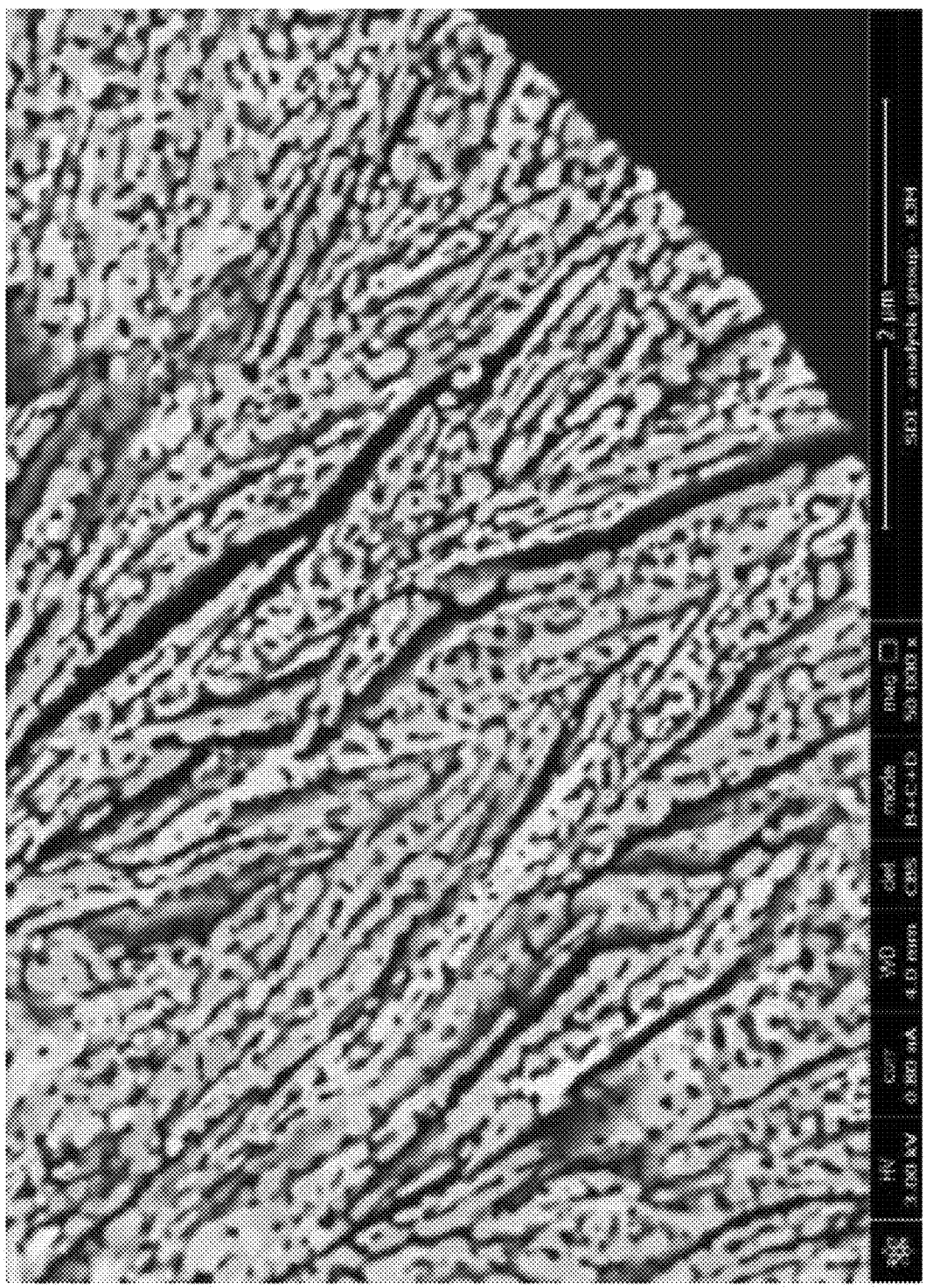
FIGS. 4A and 4B are cross-sectional SEM (Scanning Electron Microscope) photographs of the positive active material precursors prepared in Example 1 and Comparative Example 1, respectively.
Figure 4B:
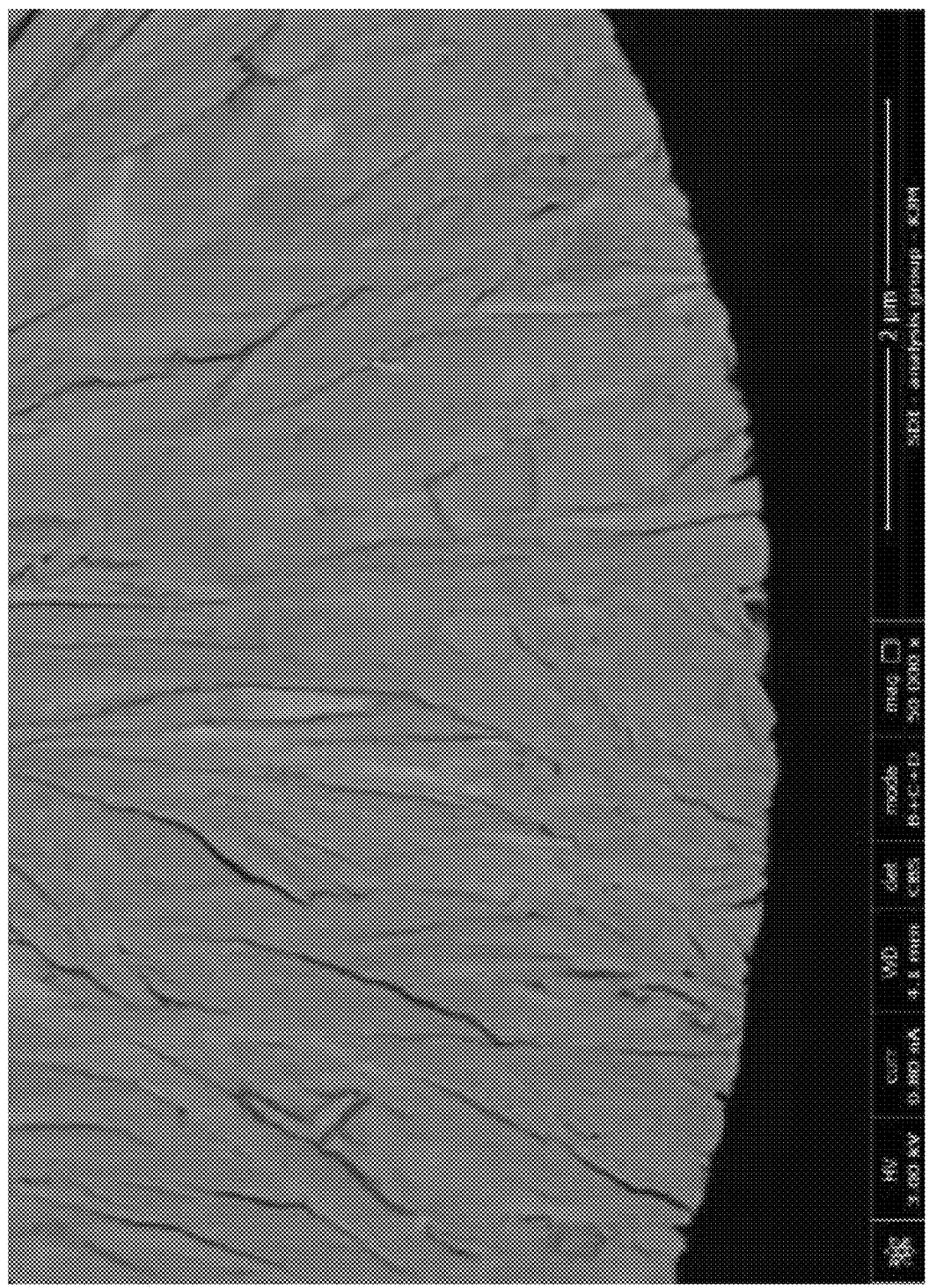
Figure 5A:
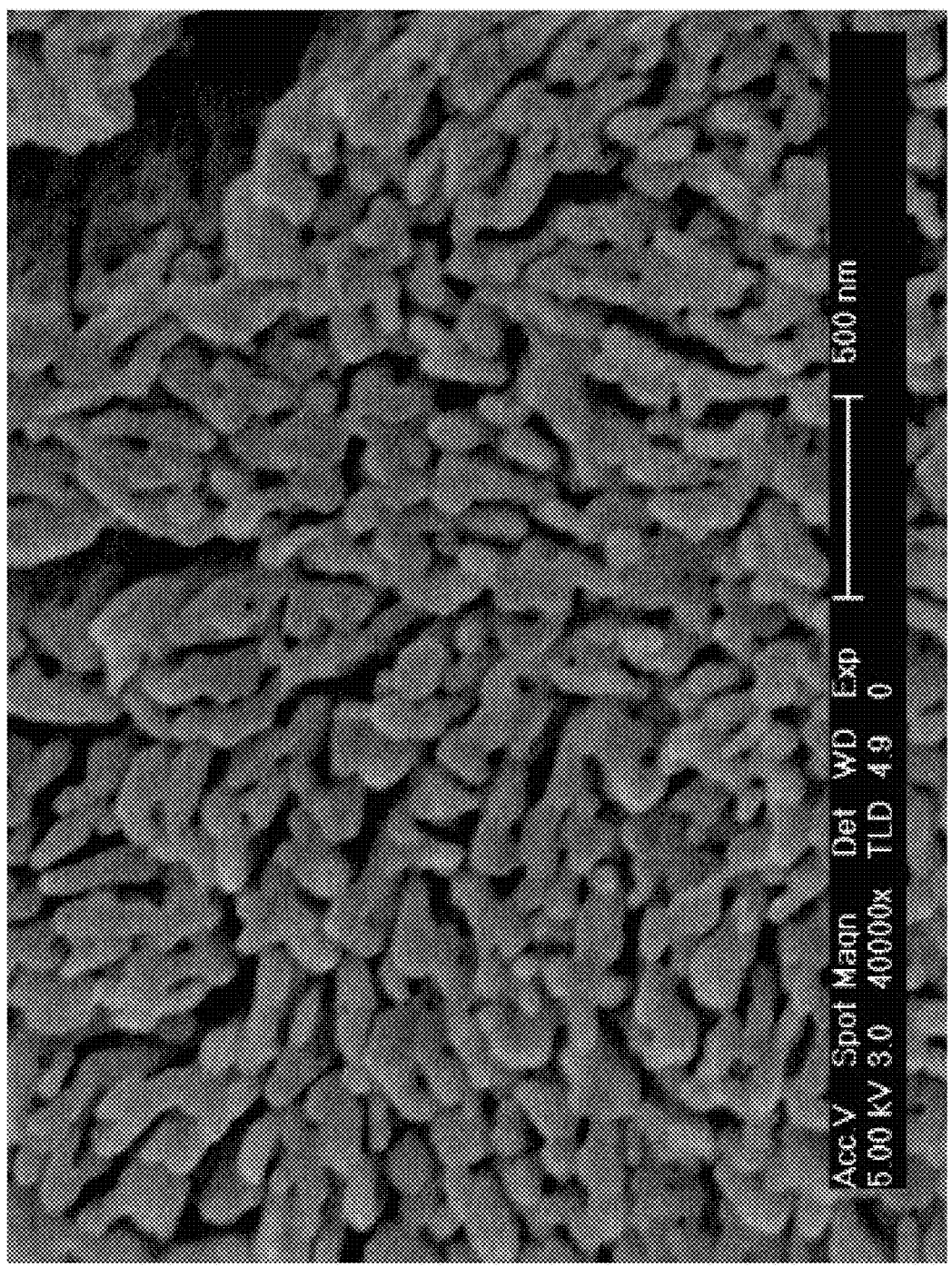
FIGS. 5A and 5B are surface SEM photographs of the positive active material precursors prepared in Example 1 and Comparative Example 1, respectively.
Figure 5B:
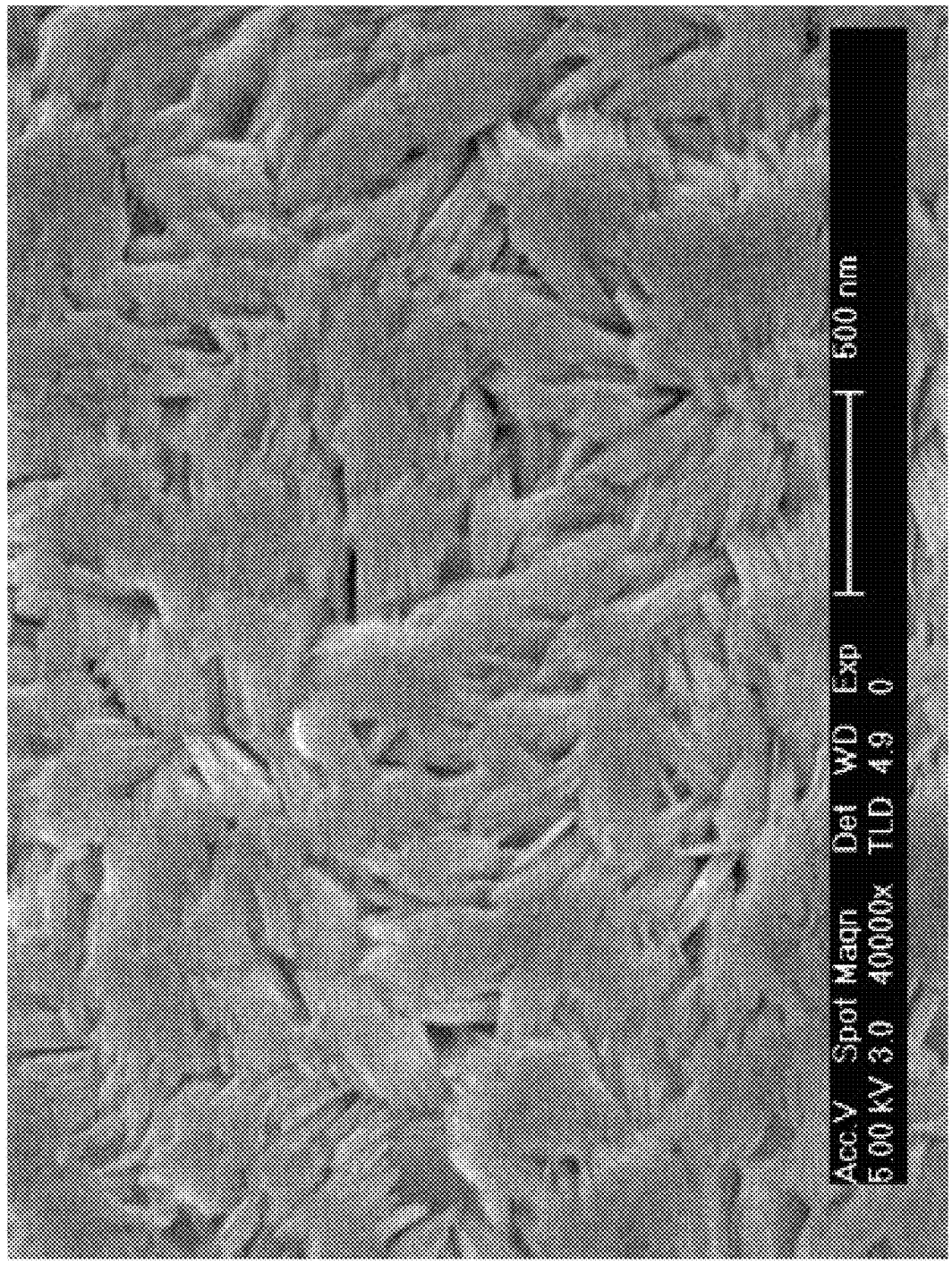

Evaluation Example 2: Scanning Electron Microscope (SEM) Analysis of Positive Active Material Precursor Each cross-section and surface SEM image of the positive active material precursor of Example 1 and Comparative Example 1 were analyzed. The cross-section SEM images of the positive active material precursors of Example 1 and Comparative Example 1 were respectively shown in FIG. 4A and FIG. 4B, and the surface SEM images thereof were respectively shown in FIG. 5A and FIG. 5B.

The positive active material precursor of Example 1 was obtained by heat-treating the transition metal hydroxide precursor, the positive active material precursor of Comparative Example 1, to remove internal moisture thereof in advance. Referring to FIGS. 4A, 4B, 5A, and 5B, the precursor particles of Comparative Example 1 exhibited smooth and continuous secondary surfaces and cross-sections, but Example 1 exhibited a needle-shaped porous structure wherein precursor secondary particles had ion channels (tunnels) on the surfaces, which were formed through transformation of morphology of the precursor particles of Comparative Example 1. Accordingly, when the positive active material of Example 1 was synthesized, the firing time was shortened, but the mass production yield was increased, which is advantageous in terms of a process cost, and accordingly, it can be sufficiently understood that a positive active material of high density and high-capacity and with improved structural stability of particles was obtained.

Evaluation Example 3: SEM Analysis of Positive Active Material

Cross-sectional SEM images of the positive active materials according to Example 1 and Comparative Example 1 were analyzed. The cross-sectional SEM images of the positive active materials of Example 1 and Comparative Example 1 are respectively shown in FIGS. 6A and 6B.

Figure 6A:
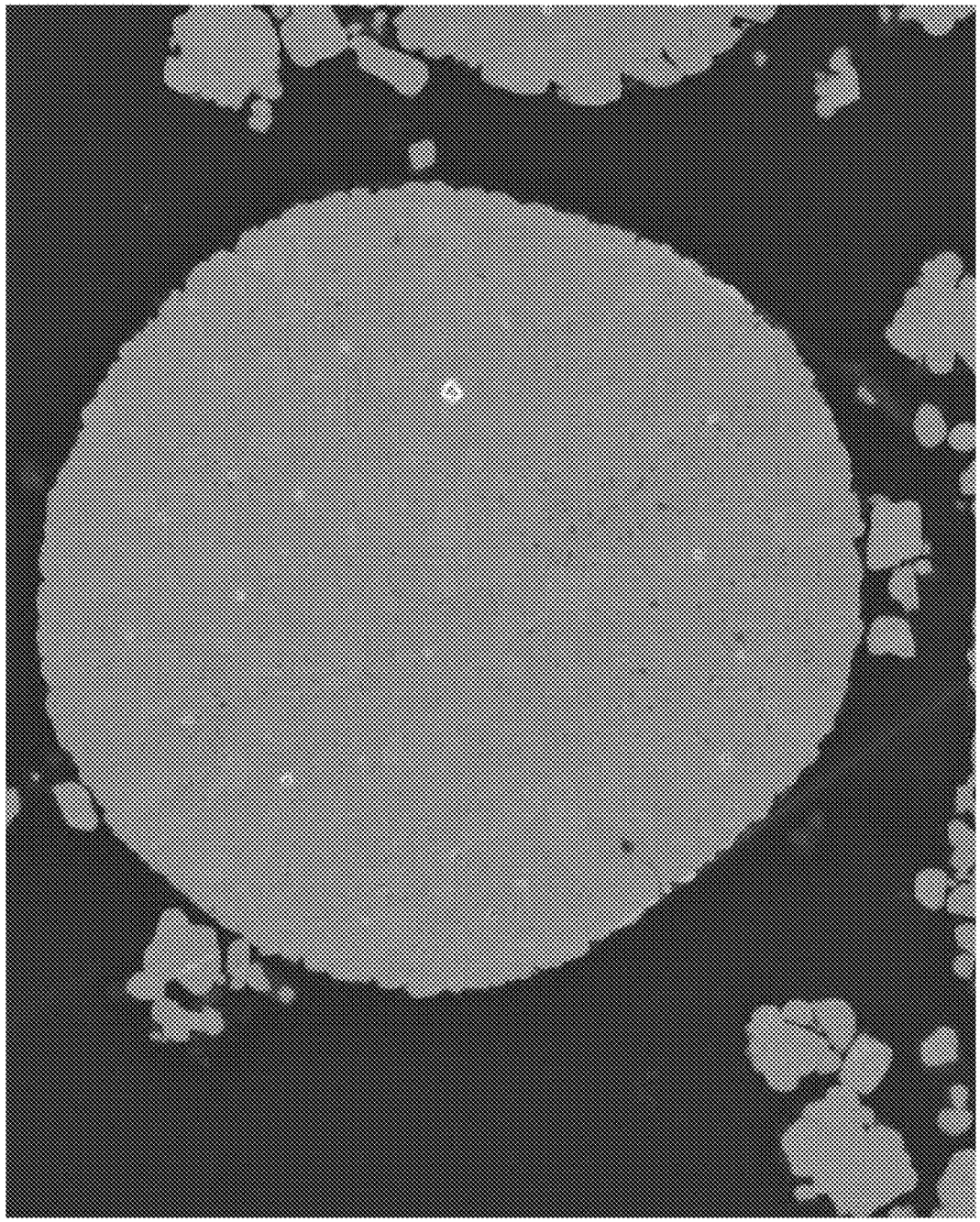
FIGS. 6A and 6B are cross-sectional SEM photographs of the positive active materials prepared in Example 1 and Comparative Example 1, respectively.
Figure 6B:
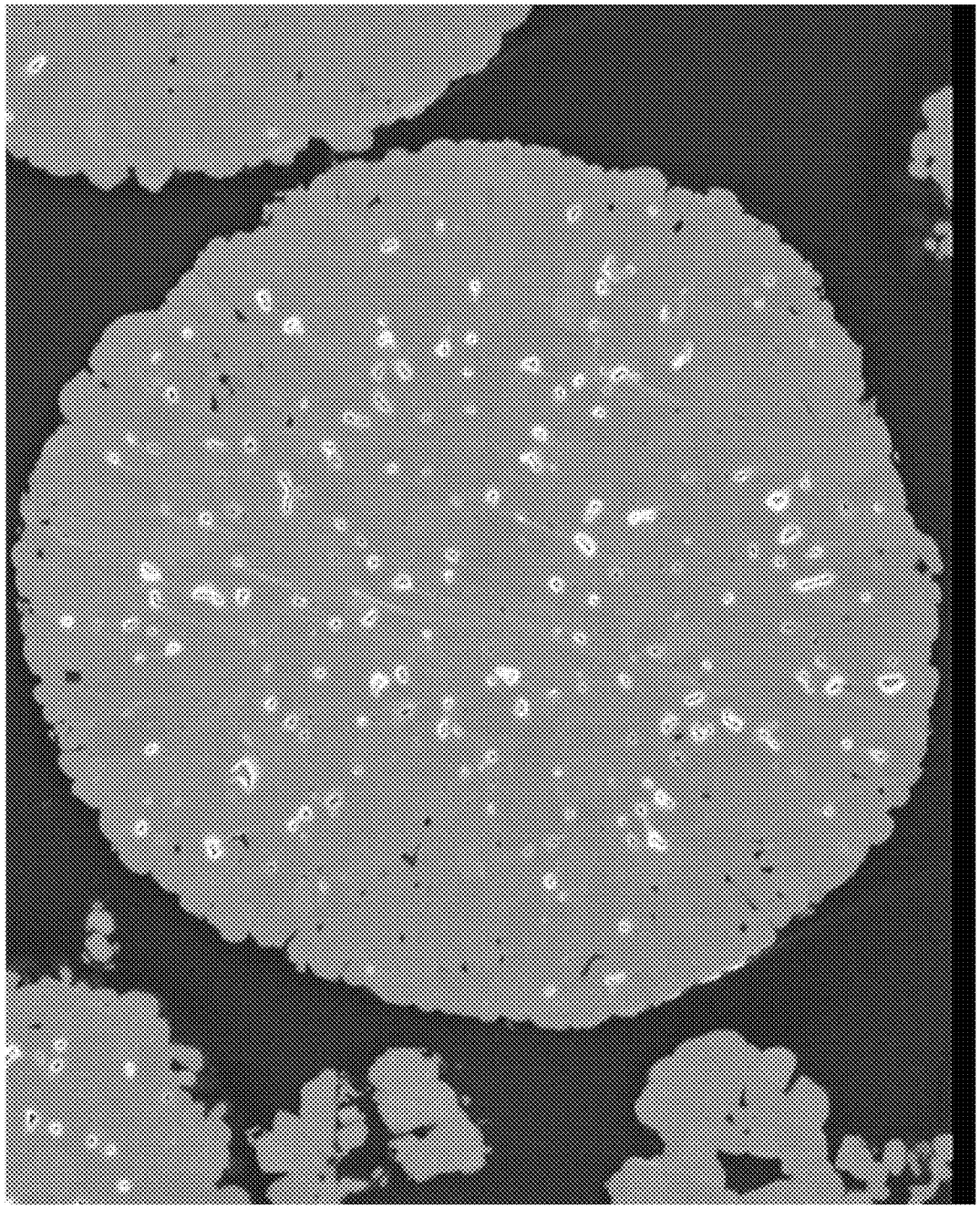

Referring to FIGS. 6A and 6B, the positive active material of Example 1 exhibited reduced internal pores and improved structural stability of the particles, compared with those of the positive active material of Comparative Example 1. Accordingly, pellet density and BET specific surface area of the positive active material are expected to be sufficiently increased.

Evaluation Example 4: Surface Residual Lithium of Positive Active Material 10 g of each positive active material according to Examples 1 to 3 and Comparative Examples 1 to 4 was dispersed in 100 mL of water, and pH titration curves were obtained by measuring pH thereof, while 0.1 M of HCl was added dropwise thereto. The pH titration curves were used to calculate residual LiOH and residual Li$_2$CO$_3$ in the positive active materials, and the residual LiOH and the residual Li$_2$CO$_3$ were summed to obtain residual lithium, which is shown in Table 2.

TABLE 2

| | Content of residual lithium (ppm) |
|---|---|
| Example 1 | 882 |
| Example 2 | 1054 |
| Example 3 | 994 |
| Comparative Example 1 | 1188 |
| Comparative Example 2 | 1221 |
| Comparative Example 3 | 1489 |
| Comparative Example 4 | 1232 |

Referring to Table 2, the positive active materials of Examples 1 to 3 exhibited lower residual lithium than those of the positive active materials of Comparative Examples 1 to 4. This result was considered to be use a transition metal composite oxide precursor having a needle-shaped or flake-shaped porous structure and an increased BET specific surface area to improve reactivity with a lithium salt when the active material was prepared.

Evaluation Example 5: Porosity, Mixture Density, and BET Specific Surface Area of Positive Active Material Porosity, pellet density, and BET specific surface areas of the positive active materials according to Examples 1 to 3 and Comparative Examples 1 to 4 were measured, and the results are shown in Table 3.

Figure 7A:
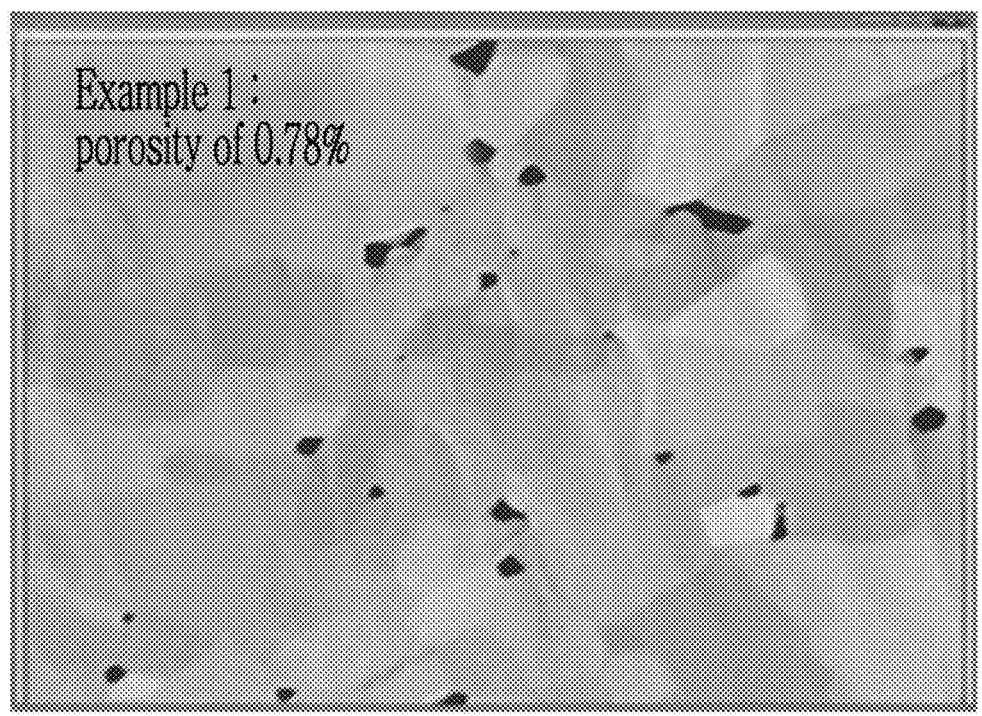
FIGS. 7A and 7B are photographs showing porosity of cross-sections of positive active materials prepared in Example 1 and Comparative Example 1, respectively.
Figure 7B:
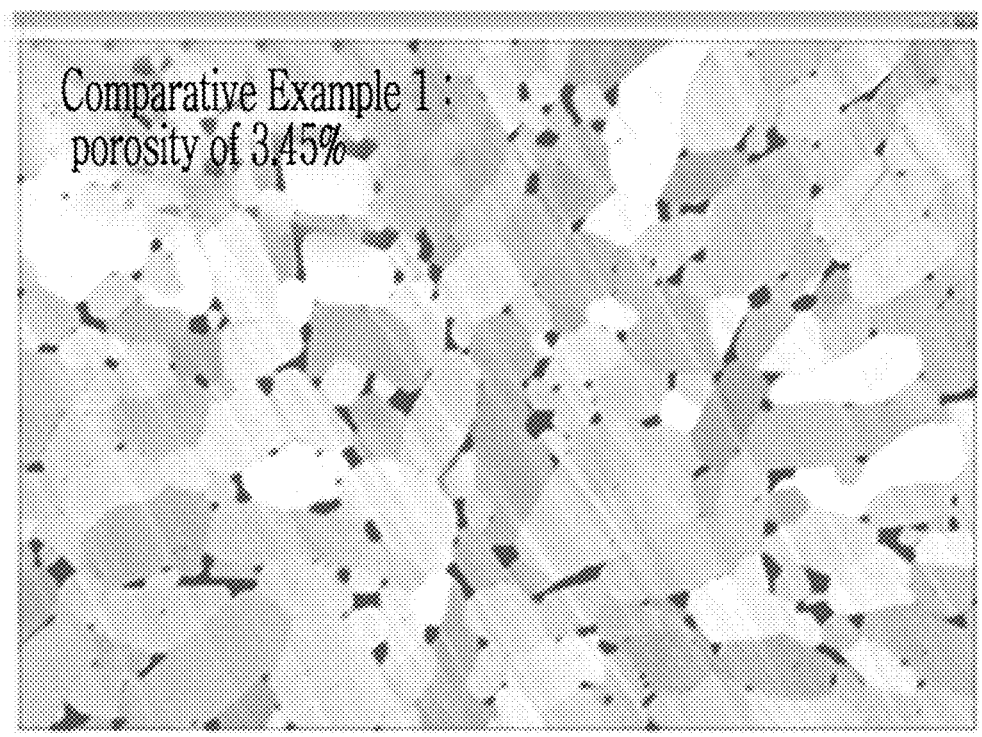

The porosity was obtained by calculating an area ratio of pores in the cross-sectional SEM image of the active material particles, and porosity-measuring images of Example 1 and Comparative Example 1 are shown in FIGS. 7A and 7B.

The BET specific surface areas were measured by using ASAP2020 (Micromeritics Instrument Corp.). Specifically, samples of the positive active materials according to Examples 1 to 3 and Comparative Examples 1 to 4 were respectively filled up to ½ of the round bottom of a sample tube by using a funnel without getting the samples on the inner wall of the tube. The samples had different specific gravities, and thus, the BET specific surface areas were based on volumes and obtained by measuring weights after the preheat treatment and converting them into surface areas. The samples were preheated at 150° C. in a vacuum state and then, free spaces were measured by injecting/releasing He (g) and adsorption amounts at each point were measured by injecting/releasing $N_2$ (g).

The pellet density was measured as follows. 3 g of the positive active materials were respectively weighed and put in a mold (an area: 1.298 cm²), and a mold bar was slowly put into the mold main body. The mold set was put under a hydraulic press and pressed with a pressure of 3 tons (metric tons) for 30 seconds, and the height thereof was measured to evaluate the pellet density.

TABLE 3

| | Porosity (%) | BET specific surface area (m²/g) | Pellet density (g/cm³) |
|---|---|---|---|
| Example 1 | 0.78 | 0.45 | 3.55 |
| Example 2 | 0.97 | 0.42 | 3.52 |
| Example 3 | 1.04 | 0.43 | 3.50 |
| Comparative Example 1 | 3.45 | 0.38 | 3.34 |
| Comparative Example 2 | 0.69 | 0.39 | 3.43 |
| Comparative Example 3 | 1.25 | 0.36 | 3.39 |
| Comparative Example 4 | 5.68 | 0.31 | 3.26 |

Referring to FIGS. 7A and 7B and Table 3, the positive active materials prepared by using a transition metal composite oxide precursor according to Examples 1 to 3 and Comparative Examples 2 to 3 had porosity of 0.5% to 2.5%, but the positive active materials prepared by using a hydroxide precursor according to Comparative Examples 1 and 4 did not.

On the other hand, the positive active materials of Examples 1 to 3 having a peak full width at half maximum of the (200) plane within the range of the described technology, when the transition metal composite oxide precursor was measured with XRD, exhibited improved BET specific surface areas and pellet density compared with those of the positive active materials according to Comparative Examples 1 to 4.

Evaluation Example 6: Interplanar Distance of Positive Active Material Primary Particles The positive active material of Example 1 was evaluated through HR-TEM analysis, and the result is shown in FIG. 8.

Figure 8:
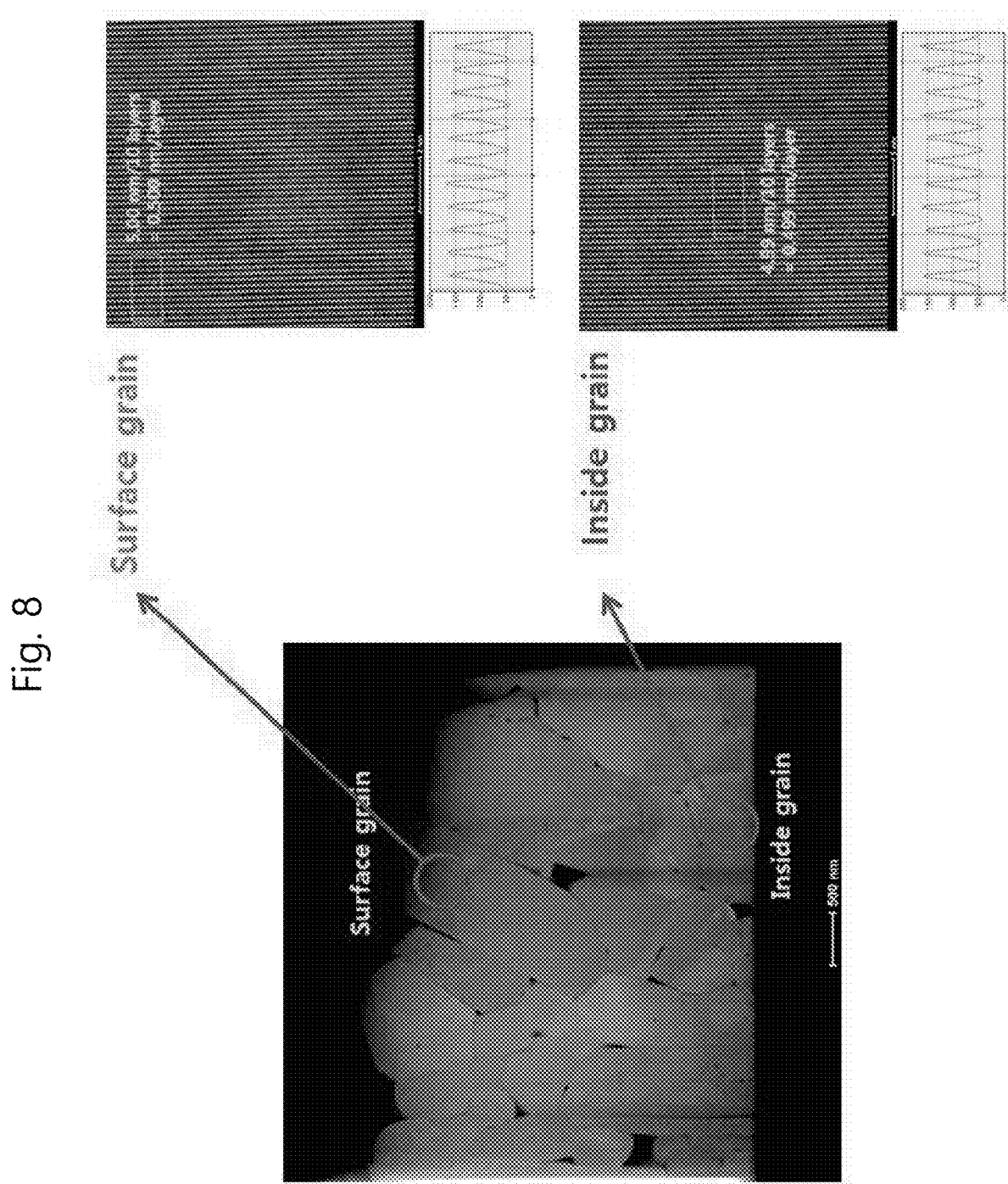
FIG. 8 is a cross-sectional high-resolution transmission electron microscopy (HR-TEM) photograph of the positive active material prepared in Example 1 and a graph showing the interplanar spacing of (003) plane of the positive active material primary particle.

Referring to FIG. 8, ten primary particles (inside grains) inside (in the cores of) the positive active material secondary particle exhibited an average interplanar spacing of 4.98 nm to 5.00 nm, and ten primary particles (surface grains) in the surface portion of the positive active material secondary particle coated with cobalt-based lithium transition metal oxide exhibited an average interplanar spacing of 4.98 nm to 5.00 nm.

Evaluation Example 7: Coating Analysis of Cobalt-Based Lithium Transition Metal Oxide The positive active material of Example 1 was analyzed by TEM-EDS (TECNAI F30, Thermo Fisher Scientific Inc.), and the result is shown in FIG. 9.

Figure 9:
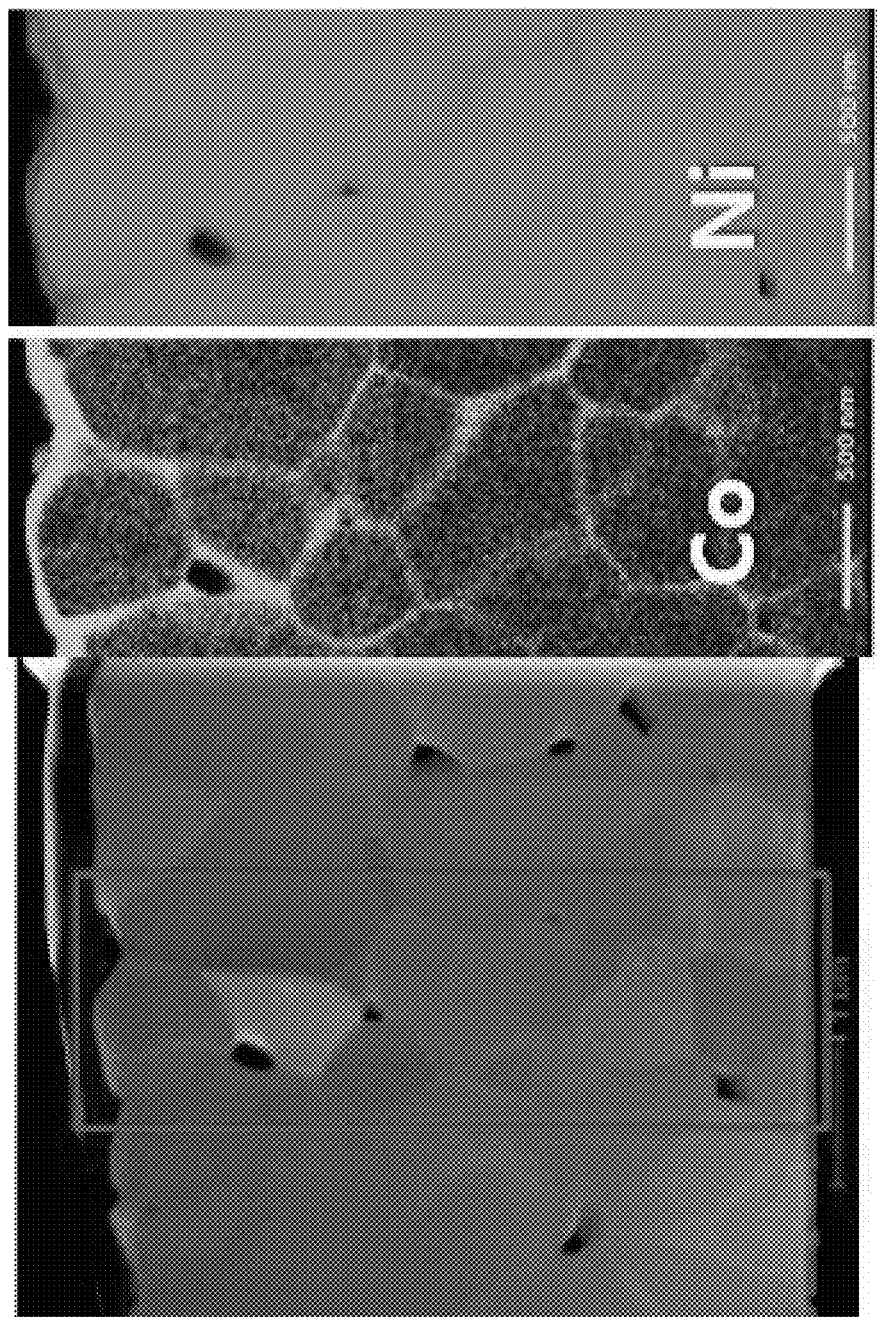
FIG. 9 is a TEM-EDS (Transmission Electron Microscope-Energy Dispersive Spectroscopy) image of the positive active material prepared in Example 1.

Referring to FIG. 9, cobalt elements were found among a plurality of primary particles included in nickel-based lithium transition metal oxide.

Evaluation Example 8: SEM (Scanning Electron Microscope) Analysis of Positive Active Material Precursor The surfaces of the positive active material precursors according to Example 1 and Comparative Example 2 were examined by taking SEM images, and the results are shown in FIGS. 10 and 11.

Figure 10:
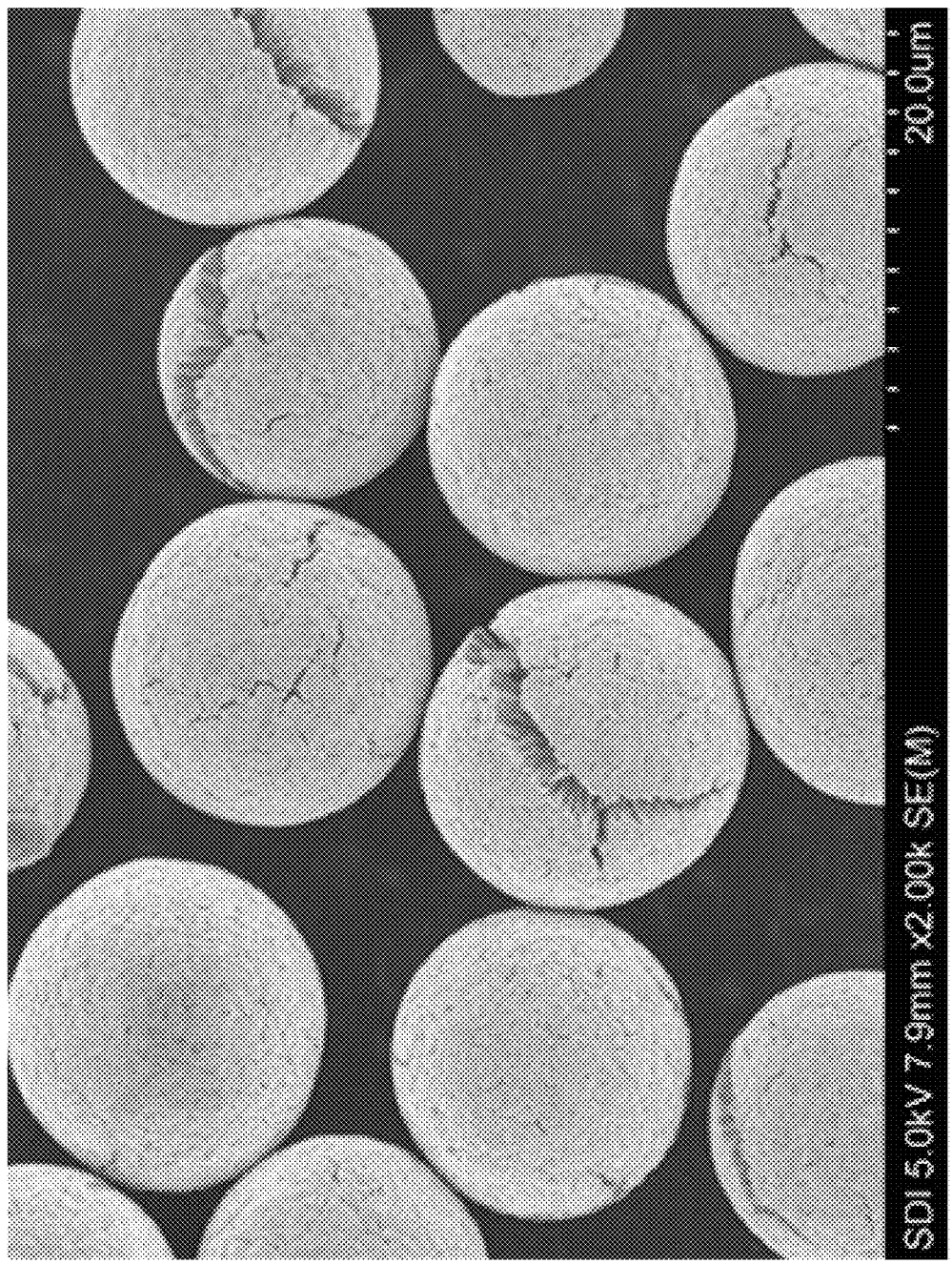
FIG. 10 is a SEM photograph of a positive active material precursor according to Comparative Example 2.
Figure 11:
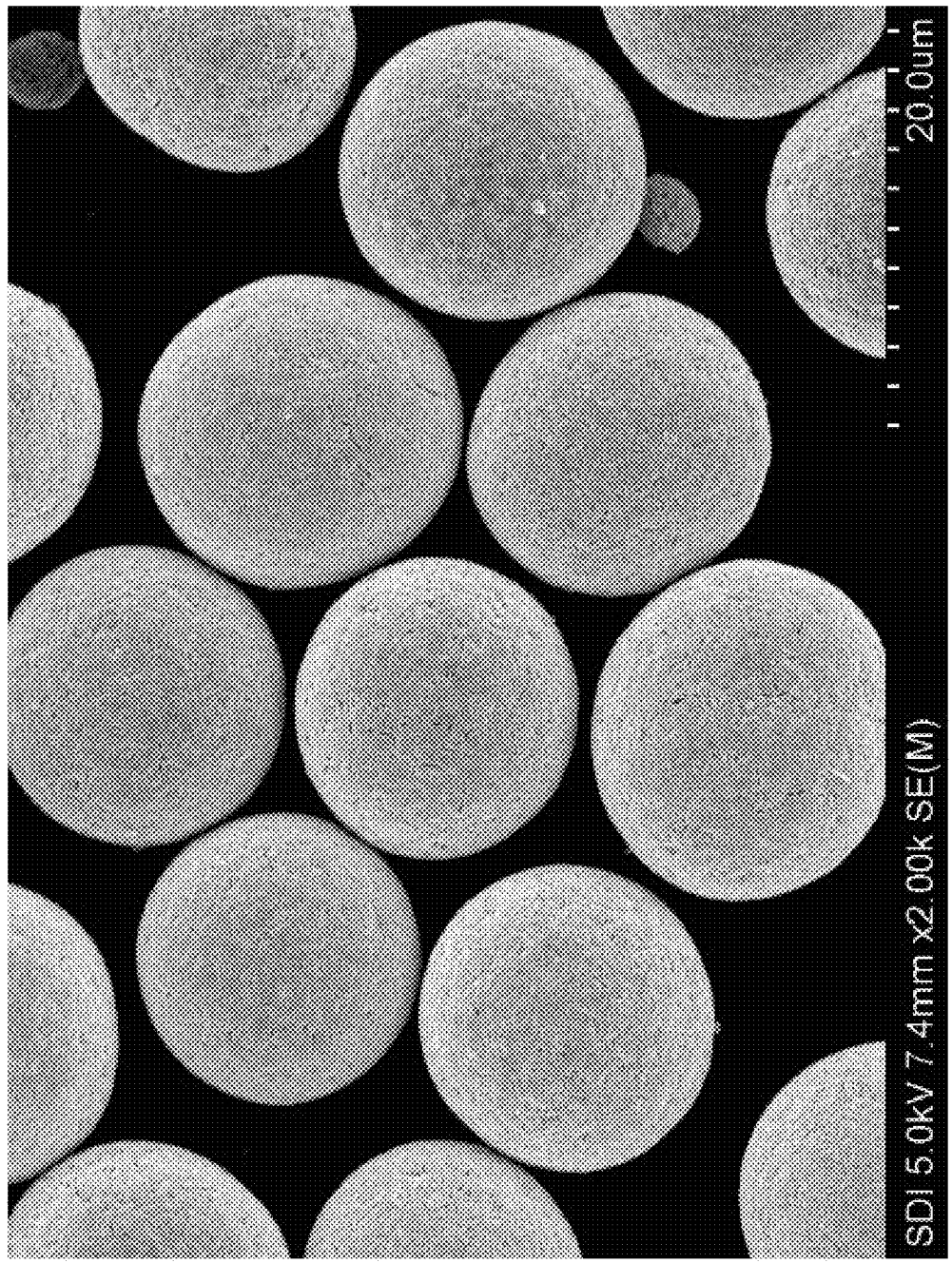
FIG. 11 is a SEM photograph of a positive active material precursor according to Example 1.

Referring to FIG. 10, the positive active material precursor particles of Comparative Example 2 were cracked. As a result, battery cycle-life characteristics might be reasonably predicted to be deteriorated. Referring to FIG. 11, the positive active material precursor particles of Example 1 were not cracked.

Evaluation Example 9: Charge/Discharge Capacity, Initial Charge and Discharge Efficiency, and High Temperature Cycle-life of Battery Cells The rechargeable lithium battery cells according to Examples 1 to 3 and Comparative Examples 1 to 3 were once charged and discharged at 0.2 C. Charge capacity, discharge capacity, and initial charge and discharge efficiency thereof are shown in Table 4.

Subsequently, the rechargeable lithium battery cells were charged under a constant current-constant voltage condition at 0.2 C (1 C=200 mAh/g) under a 3.0 V cut-off condition and then, discharged under a constant current condition at 0.2 C under a 4.2 V and 0.05 C cut-off condition at a high temperature (45° C.), and discharge capacity of the cells at each 1.0 C, 100 cycles was measured to calculate capacity retention (%) thereof. The results are shown in Table 4.

TABLE 4

|  | Charge capacity (0.2 C, mAh/g) | Discharge capacity (0.2 C, mAh/g) | Initial charge and discharge efficiency (%) | Capacity retention (1 C, 100 cycles, 45° C., %) |
| --- | --- | --- | --- | --- |
| Example 1 | 230.3 | 207.2 | 90.0 | 81.4 |
| Example 2 | 230.2 | 205.5 | 89.3 | 80.2 |
| Example 3 | 230.3 | 205.1 | 89.1 | 80.7 |
| Comparative Example 1 | 229.1 | 202.4 | 88.3 | 76.8 |
| Comparative Example 2 | 225.4 | 199.8 | 88.6 | 77.3 |
| Comparative Example 3 | 227.5 | 201.8 | 88.7 | 78.9 |
| Comparative Example 4 | 228.7 | 200.2 | 87.5 | 74.9 |

Referring to Table 4, charge capacity, discharge capacity, and initial charge and discharge efficiency, and high temperature cycle-life characteristics of the battery cells according to Examples 1 to 3 were improved, compared with those of the battery cells according to Comparative Examples 1 to 4.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A positive active material precursor for a rechargeable lithium battery, the positive active material precursor comprising:
a transition metal composite oxide precursor configured to exhibit a peak full width at half maximum of a (200) plane (2θ=about 42° to about 44°) in an X-ray diffraction analysis in a range of about 0.3° to about 0.5°.

2. The positive active material precursor of claim 1, wherein the transition metal composite oxide precursor comprises a compound represented by Chemical Formula 1:

$Ni_xCo_yM_{1-x-y}O$, wherein M is at least one selected from Mn, Ni, Co, Al, Fe, V, Ti, Mg, Zr, B, F, and Cr, 0.3≤x≤1, 0≤y≤0.7, and 0.3≤x+y≤1.

3. The positive active material precursor of claim 1, wherein the transition metal composite oxide precursor comprises a first set of secondary particles including a first plurality of primary particles aggregated to each other, and wherein each of the first primary particles has a flake or needle shape.

4. The positive active material precursor of claim 1, wherein the transition metal composite oxide precursor has a Brunauer—Emmett—Teller (BET) specific surface area of about 20 m²/g to about 60 m²/g.

5. A positive active material for a rechargeable lithium battery prepared from the positive active material precursor of claim 1, the positive active material comprising:
a nickel-based lithium transition metal oxide represented by Chemical Formula 2 comprising a second set of secondary particles including a second plurality of primary particles aggregated to each other:

$Li_aNi_xCo_yM_{1-x-y}O_2$, wherein M is at least one selected from Mn, Ni, Co, Al, Fe, V, Ti, Mg, Zr, B, F, and Cr, 0.9≤a≤1.1, 0.3≤x≤1, 0≤y≤0.7, and 0.3≤x+y≤1.

6. The positive active material of claim 5, wherein the second primary particles have a (003) plane, wherein an average interplanar spacing ($d_{(003)}$) of the (003) plane of the second primary particles (surface grains) present in a surface portion of the second set of secondary particles is in the range of about 4.98 nm to about 5.00 nm, and wherein an average interplanar spacing ($d_{(003)}$) of the (003) plane of the second primary particles (inside grains) present in a center portion of the second set of secondary particles is in the range of about 4.98 nm to about 5.00 nm.

7. The positive active material of claim 6, wherein a standard deviation of the interplanar spacings ($d_{(003)}$) of the second primary particles present in the second set of secondary particles is in the range of about 0.005 to about 0.03.

8. The positive active material of claim 5, further comprising a cobalt-based lithium transition metal oxide inside the second set of secondary particles or between the second primary particles.

9. The positive active material of claim 8, wherein the cobalt-based lithium transition metal oxide is disposed in an area of less than or equal to about 30% of a total radius of the second set of secondary particles.

10. The positive active material of claim 8, wherein the cobalt-based lithium transition metal oxide is included in an amount of about 1 wt % to about 5 wt % based on a total weight of the positive active material.

11. The positive active material of claim 5, wherein the positive active material has a porosity of about 0.5% to about 2.5%.

12. The positive active material of claim 5, wherein the positive active material has a Brunauer-Emmett-Teller (BET) specific surface area of about 0.4 m²/g to about 0.5 m²/g.

13. The positive active material of claim 5, wherein the positive active material has a pellet density of about 3.2 g/cm³ to about 3.6 g/cm³.

14. The positive active material of claim 5, wherein the first set of secondary particles are different from the second set of secondary particles, and wherein the first plurality of primary particles are the same as the second plurality of primary particles.

15. A method of preparing a positive active material from the positive active material precursor of claim 1 for a rechargeable lithium battery, the method comprising:
mixing a nickel compound, a cobalt compound, and optionally a metal compound to obtain a first mixture;
subjecting the first mixture to a co-precipitation reaction to obtain a first resulting product, washing with water, filtering and drying the first resulting product to prepare a transition metal hydroxide precursor represented by Chemical Formula 1A, $Ni_xCo_yM_{1-x-y}(OH)_2$, wherein M is at least one selected from Mn, Ni, Co, Al, Fe, V, Ti, Mg, Zr, B, F, and Cr, 0.3≤x≤1, 0≤y≤0.7, and 0.3≤x+y≤1;

subjecting the transition metal hydroxide precursor to a primary heat treatment at about 400° C. to about 600° C. for about 0.5 hour to about 20 hours to prepare a transition metal composite oxide precursor; and
mixing the transition metal composite oxide precursor and a lithium salt to obtain a second mixture and performing a secondary heat treatment on the second mixture to prepare a nickel-based lithium transition metal oxide.

16. The method of claim 15, wherein:
the primary heat treatment comprises a step firing process comprising a temperature increase process, a maintenance process, a reaction process and a temperature decrease process,
the temperature increase process is performed by heating the transition metal hydroxide precursor at a rate of about 1° C./min to about 5° C./min,
the maintenance process is performed at about 150° C. to about 250° C. for about 0.5 hours to about 10 hours,
the reaction process is performed at about 400° C. to about 600° C. for about 0.5 hours to about 10 hours, and
the temperature decrease process is performed by decreasing a temperature at a rate of about 1° C./min to about 5° C./min.

17. The method of claim 15, wherein the lithium salt comprises a dehydrated lithium salt including LiOH.

18. The method of claim 17, wherein the dehydrated lithium salt is prepared by vacuum-drying the hydrated lithium salt at a temperature of about 50° C. to about 200° C. for about 0.5 hours to about 20 hours then pulverizing a resultant.

19. The method of claim 15, wherein the secondary heat treatment comprises heating the second mixture at a temperature of about 600° C. to about 800° C. for about 5 hours to about 25 hours.

20. The method of claim 15, further comprising washing the nickel-based lithium transition metal oxide and performing a third heat treatment after adding a cobalt raw material, sodium hydroxide, and optionally a metal raw material.

* * * * *

UNITED STATES PATENT AND TRADEMARK OFFICE
CERTIFICATE OF CORRECTION

PATENT NO. : 11,955,632 B2
APPLICATION NO. : 17/091525
DATED : April 9, 2024
INVENTOR(S) : Jinhwa Kim et al.

Page 1 of 2

It is certified that error appears in the above-identified patent and that said Letters Patent is hereby corrected as shown below:

In the Specification

Column 2, Line 24, delete "$Li_aNi_xCO_yM_{1-x-y}O2$" and insert -- $Li_aNi_xCo_yM_{1-x-y}O_2$ --.

Column 2, Line 32, delete "$(d_{(003)}))$" and insert -- $(d_{(003)})$ --.

Column 2, Line 36, delete "$(d_{(003)}))$" and insert -- $(d_{(003)})$ --.

Column 2, Line 40, delete "$(d_{(003)}))$" and insert -- $(d_{(003)})$ --.

Column 5, Line 4-5, delete "the a" and insert -- a --.

Column 8, Line 13 (approx.), delete "$Li_aNi_xCO_yM_{1-x-y}O2$" and insert -- $Li_aNi_xCo_yM_{1-x-y}O_2$ --.

Column 11, Line 38, delete "NOx" and insert -- $NO_x$ --.

Column 11, Line 38, delete "SOx" and insert -- $SO_x$ --.

Column 11, Line 50, delete "NOx" and insert -- $NO_x$ --.

Column 11, Line 50, delete "SOx" and insert -- $SO_x$ --.

Column 16, Line 51, delete "$LiN(SO_2C_2F_6)_2$," and insert -- $LiN(SO_2C_2F_5)_2$, --.

Column 16, Line 52, delete "$LiAlO_4$," and insert -- $LiAlCl_4$, --.

Column 19, Line 64, delete "28" and insert -- 2θ --.

Signed and Sealed this
Twenty-seventh Day of August, 2024

Katherine Kelly Vidal
*Director of the United States Patent and Trademark Office*

CERTIFICATE OF CORRECTION (continued)
U.S. Pat. No. 11,955,632 B2

In the Claims

Column 23, Line 41, Claim 1, delete "(2θθ" and insert -- (2θ --.

Column 23, Line 46 (approx.), In Claim 2, after "$Ni_xCo_yM_{1-x-y}O$," insert -- [Chemical Formula 1] --.

Column 24, Line 1, Claim 5, after "$Li_aNi_xCo_yM_{1-x-y}O_2$," insert -- [Chemical Formula 2] --.

Column 24, Line 7 (approx.), Claim 6, delete "$(d_{(003)})$" and insert -- $(d_{(003)})$ --.

Column 24, Line 11 (approx.), Claim 6, delete "$(d_{(003)})$" and insert -- $(d_{(003)})$ --.

Column 24, Line 17 (approx.), Claim 7, delete "$(d_{(003)})$" and insert -- $(d_{(003)})$ --.

Column 24, Line 57 (approx.), Claim 15, after "$Ni_xCo_yM_{1-x-y}(OH)_2$," insert -- [Chemical Formula 1A] --.